(12) United States Patent
Kim et al.

(10) Patent No.: US 11,444,815 B2
(45) Date of Patent: Sep. 13, 2022

(54) METHOD FOR TRANSMITTING AND RECEIVING UPLINK SIGNAL IN WIRELESS COMMUNICATION SYSTEM, AND APPARATUS THEREFOR

(71) Applicant: LG ELECTRONICS INC., Seoul (KR)

(72) Inventors: Jaehyung Kim, Seoul (KR); Seunggye Hwang, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/970,214

(22) PCT Filed: Feb. 14, 2019

(86) PCT No.: PCT/KR2019/001853
§ 371 (c)(1),
(2) Date: Aug. 14, 2020

(87) PCT Pub. No.: WO2019/160372
PCT Pub. Date: Aug. 22, 2019

(65) Prior Publication Data
US 2021/0203538 A1    Jul. 1, 2021

Related U.S. Application Data

(60) Provisional application No. 62/630,337, filed on Feb. 14, 2018.

(51) Int. Cl.
*H04L 27/26* (2006.01)
*H04L 27/20* (2006.01)

(52) U.S. Cl.
CPC .... *H04L 27/26526* (2021.01); *H04L 27/2082* (2013.01); *H04L 27/2614* (2013.01)

(58) Field of Classification Search
None
See application file for complete search history.

(56) References Cited

U.S. PATENT DOCUMENTS

| 2014/0119284 A1* | 5/2014 | Baldemair | ............ | H04L 1/0026 370/328 |
| 2016/0192388 A1* | 6/2016 | Ekpenyong | ........... | H04L 1/1829 370/329 |

(Continued)

FOREIGN PATENT DOCUMENTS

WO    WO2017135693    8/2017

OTHER PUBLICATIONS

Ericsson, On the Design of Long PUCCH for more than 2 bits, R1-1718800, 3GPP TSG RAN WG1 Meeting#90bis, Prague, Czech Republic, Oct. 9-13, 2017, 17 pages.

(Continued)

*Primary Examiner* — Diane L Lo
(74) *Attorney, Agent, or Firm* — Fish & Richardson P.C.

(57) ABSTRACT

The present specification provides a method by which a terminal transmits an uplink signal in a wireless communication system. Particularly, the terminal scrambles a plurality of bits for transmission of an uplink signal, and generates a plurality of complex symbols by modulating the plurality of bits according to a specific modulation method. In addition, the terminal repetitively performs, a predetermined number of times, discrete Fourier transform (DFT) and inverse fast Fourier transform (IFFT) on at least one complex symbol of the plurality of complex symbols, and transmits the uplink signal, which is generated through the DFT and IFFT, to a base station, wherein the at least one complex symbol has a phase value which is increased or reduced as much as a specific value according to a symbol index.

20 Claims, 17 Drawing Sheets

(56) References Cited

U.S. PATENT DOCUMENTS

2017/0041103 A1\* 2/2017 Maattanen ............ H04L 1/1812
2018/0375705 A1\* 12/2018 Gaal ................... H04L 27/2602
2019/0173616 A1\* 6/2019 Xiong ............... H04W 72/0466
2019/0222451 A1\* 7/2019 Yang .................... H04L 1/0003

OTHER PUBLICATIONS

Nokia, Nokia Shanghai Bell, OFDM signal generation, R1-1800802, 3GPP TSG-RAN WG1 NR AH #18-01, Vancouver, Canada Jan. 22-26, 2018, 9 pages.
PCT International Search Report in International Apple. No. PCT/KR2019/001853, dated Feb. 14, 2014, 7 pages (with English translation).
Qualcomm Incorporated, Long PUCCH design with more than 2 bits UCI payload, R1-1720683, 3GPP TSG RAN WG1 Meeting #91, Reno, USA, Nov. 27-Dec. 1, 2017, 10 pages.
Qualcomm Incorporated, Remaining issues for long PUCCH, R1-1800872, 3GPP TSG RAN WG1 Meeting AH 1801, Vancouver, Canada, Jan. 22-26, 2018, 7 pages.
Extended European Search Report in European Appln. No. 19754040. 4, dated Oct. 11, 2021, 9 pages.
InterDigital, Inc., "On pi/2 BPSK modulation for long PUCCH," R1-1720639, 3GPP TSG RAN WG1 Meeting 91, Reno, CA, dated Nov. 27-Dec. 1, 2017, 5 pages.
LG Electronics, "Remaining issues on long-duration PUCCH," R1-1802211, 3GPP TSG RAN WG1 Meeting #92, Athens, Greece, dated Feb. 26-Mar. 2, 2018, 7 pages.

\* cited by examiner

[FIG. 1]
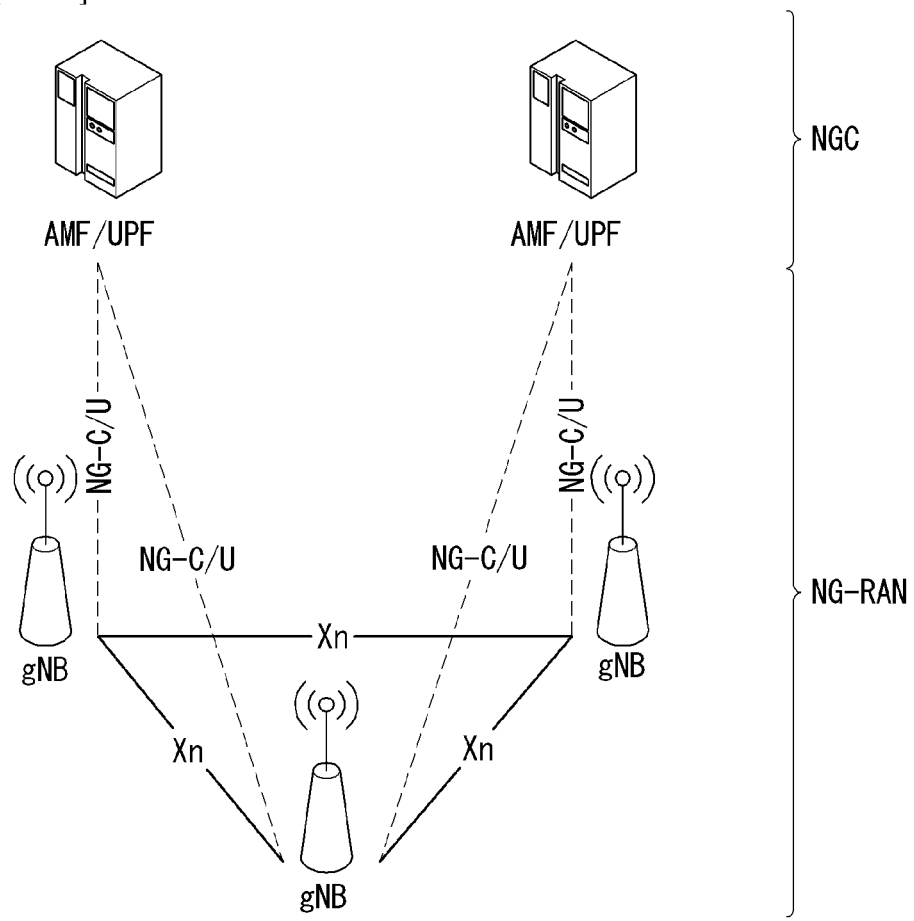
[FIG. 2]
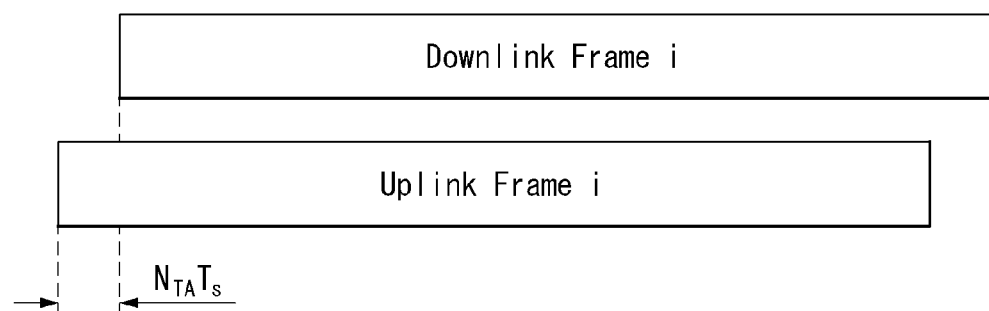

[FIG. 3]
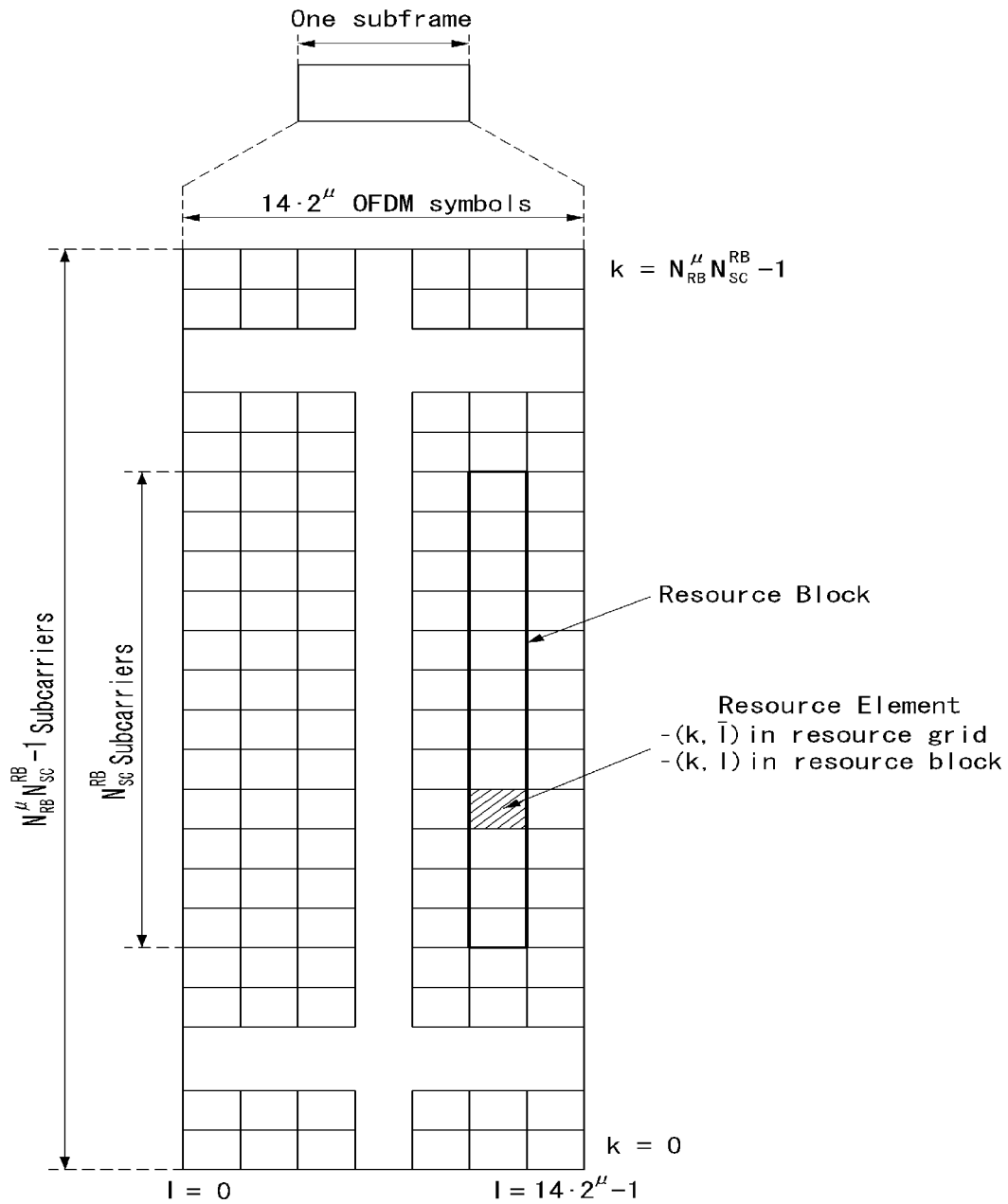

[FIG. 4]
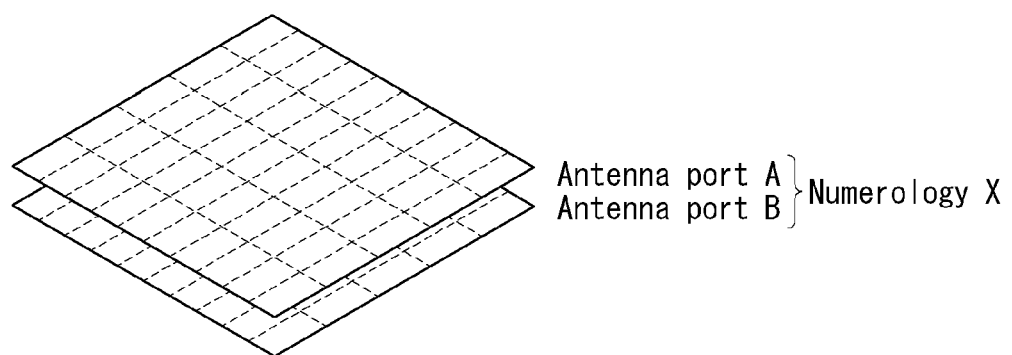
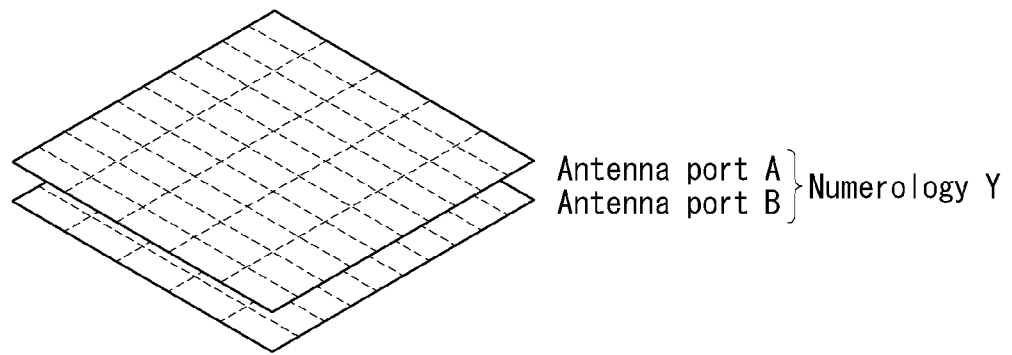

[FIG. 5]
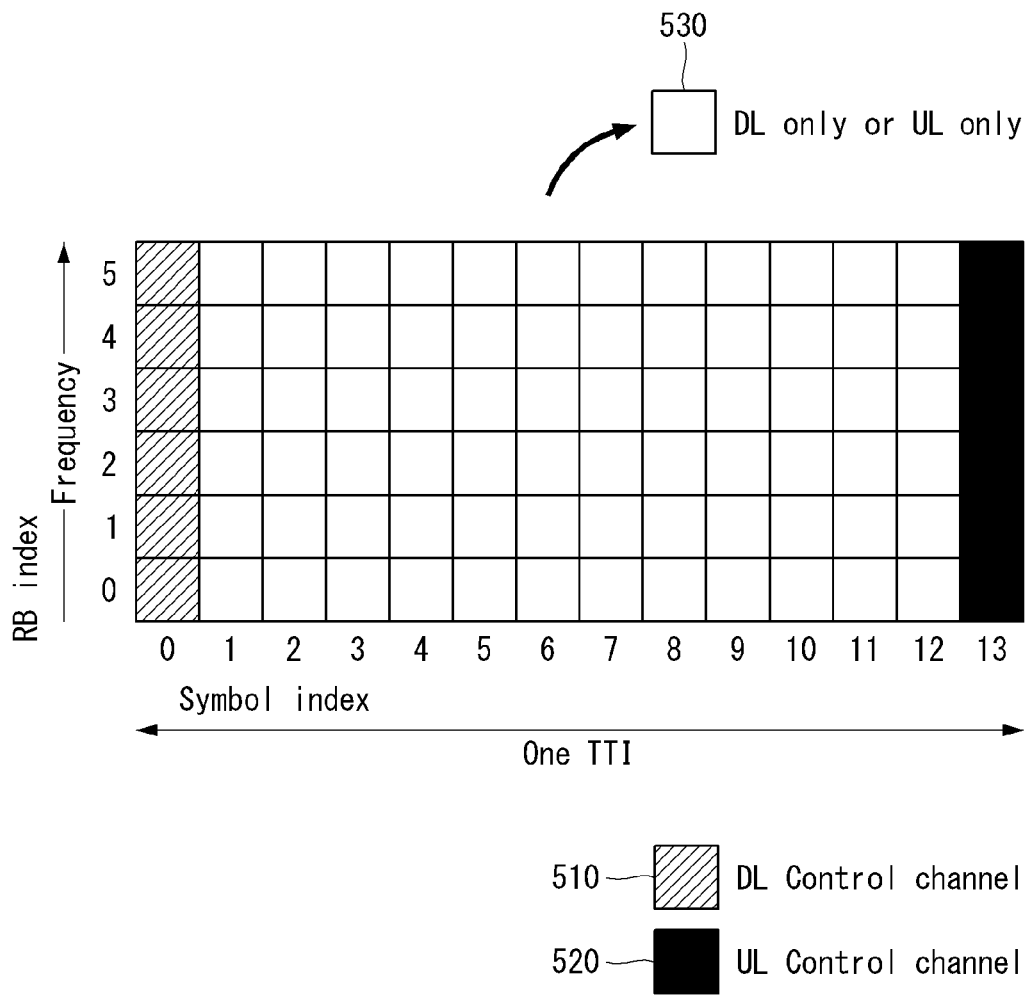

[FIG. 6]
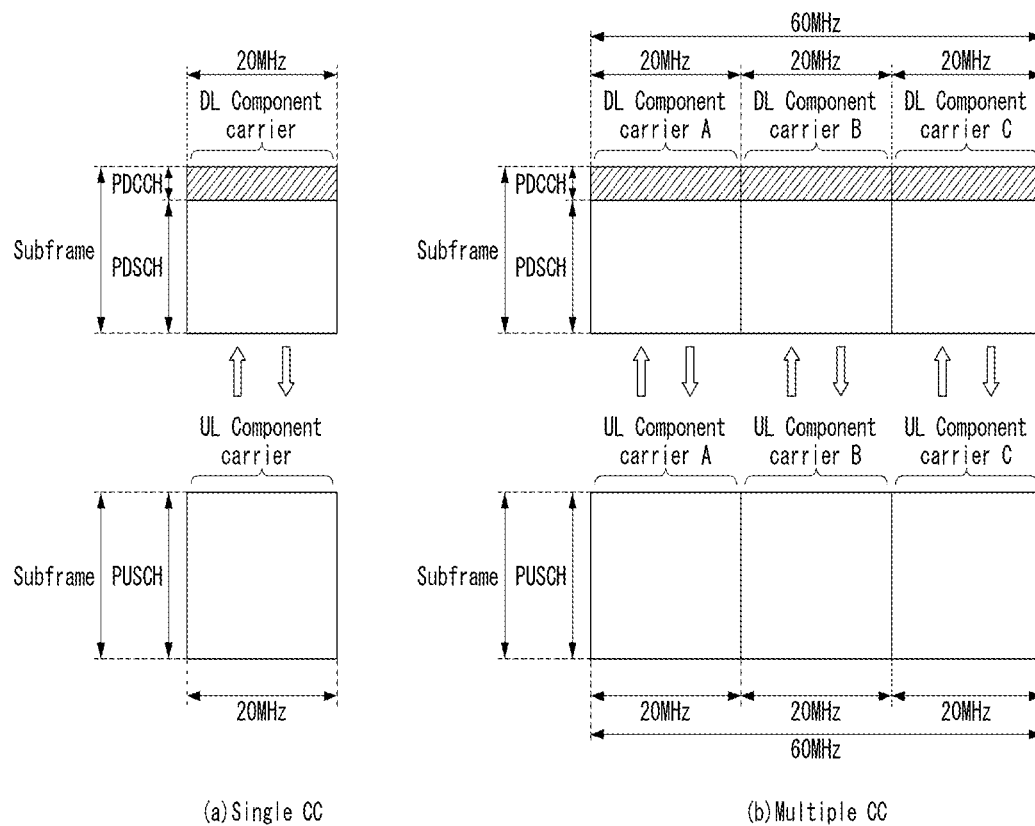
(a) Single CC
(b) Multiple CC

[FIG. 7]
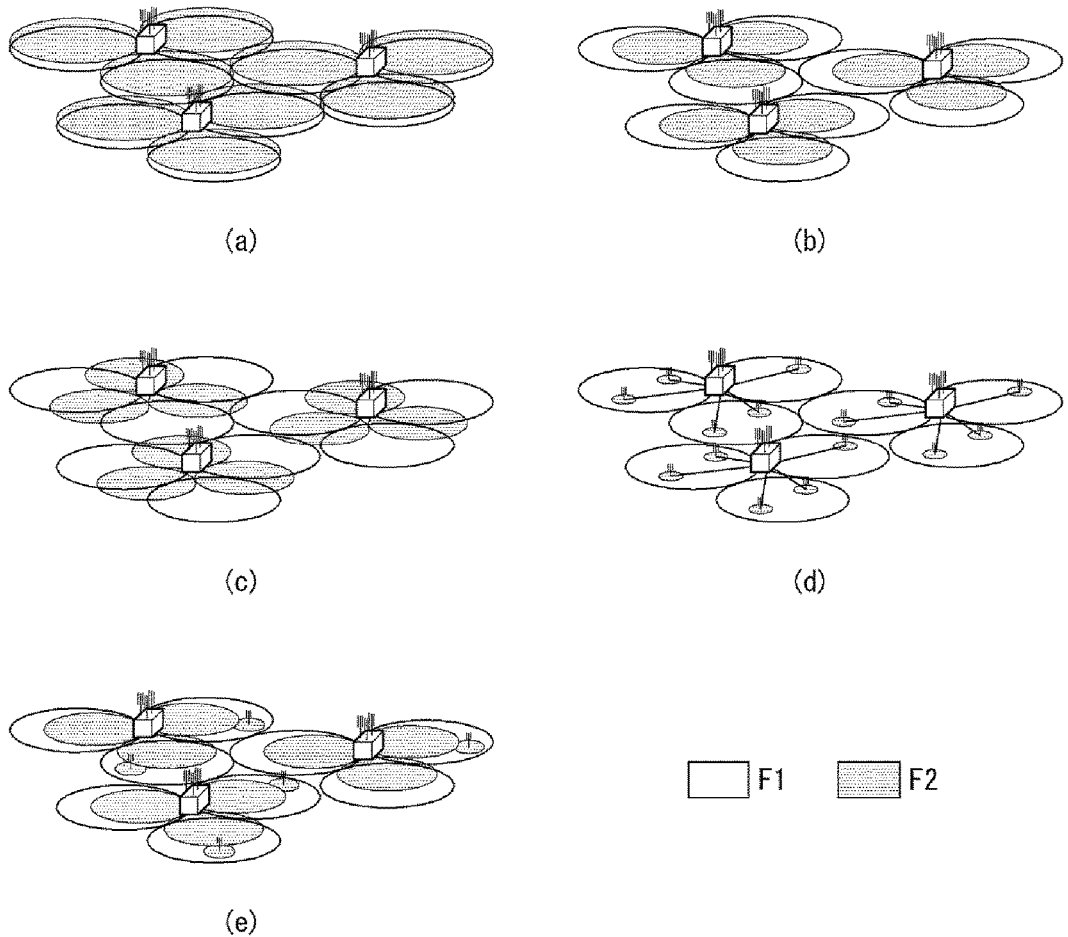

[FIG. 8]
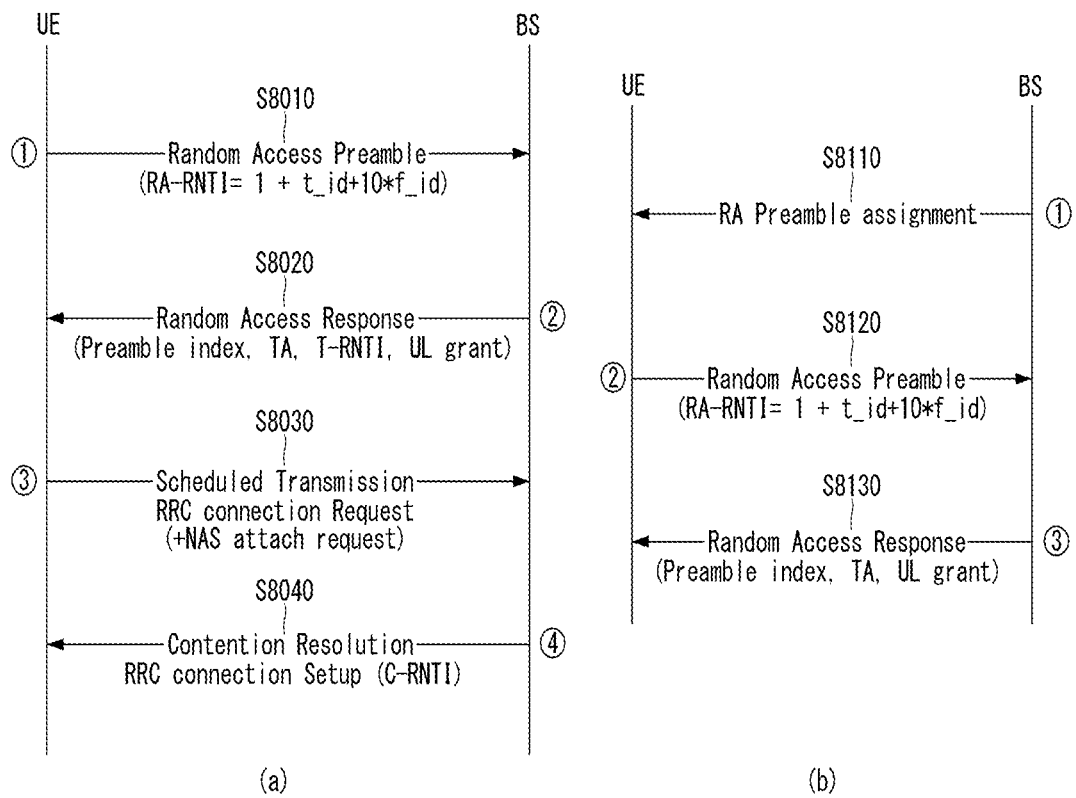
(a)                    (b)

[FIG. 9]
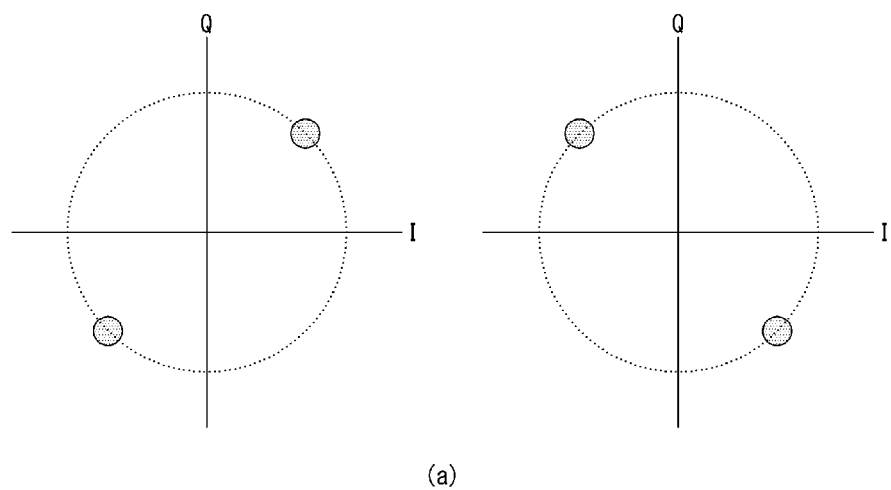
(a)
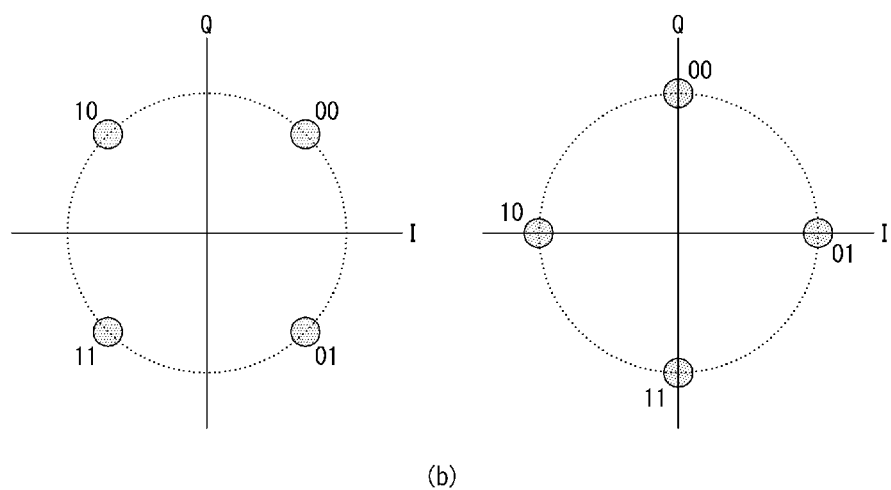
(b)

[FIG. 10]
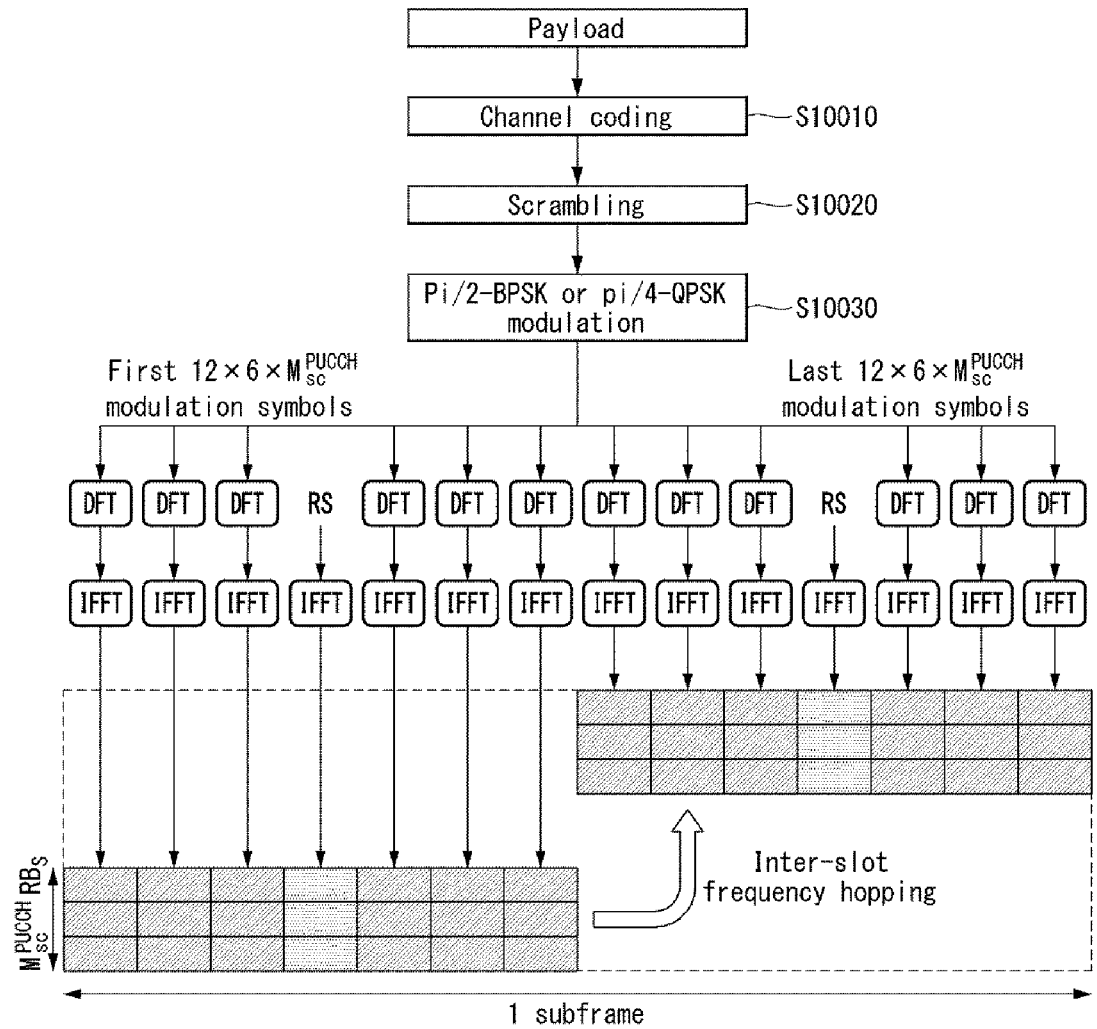

[FIG. 11]
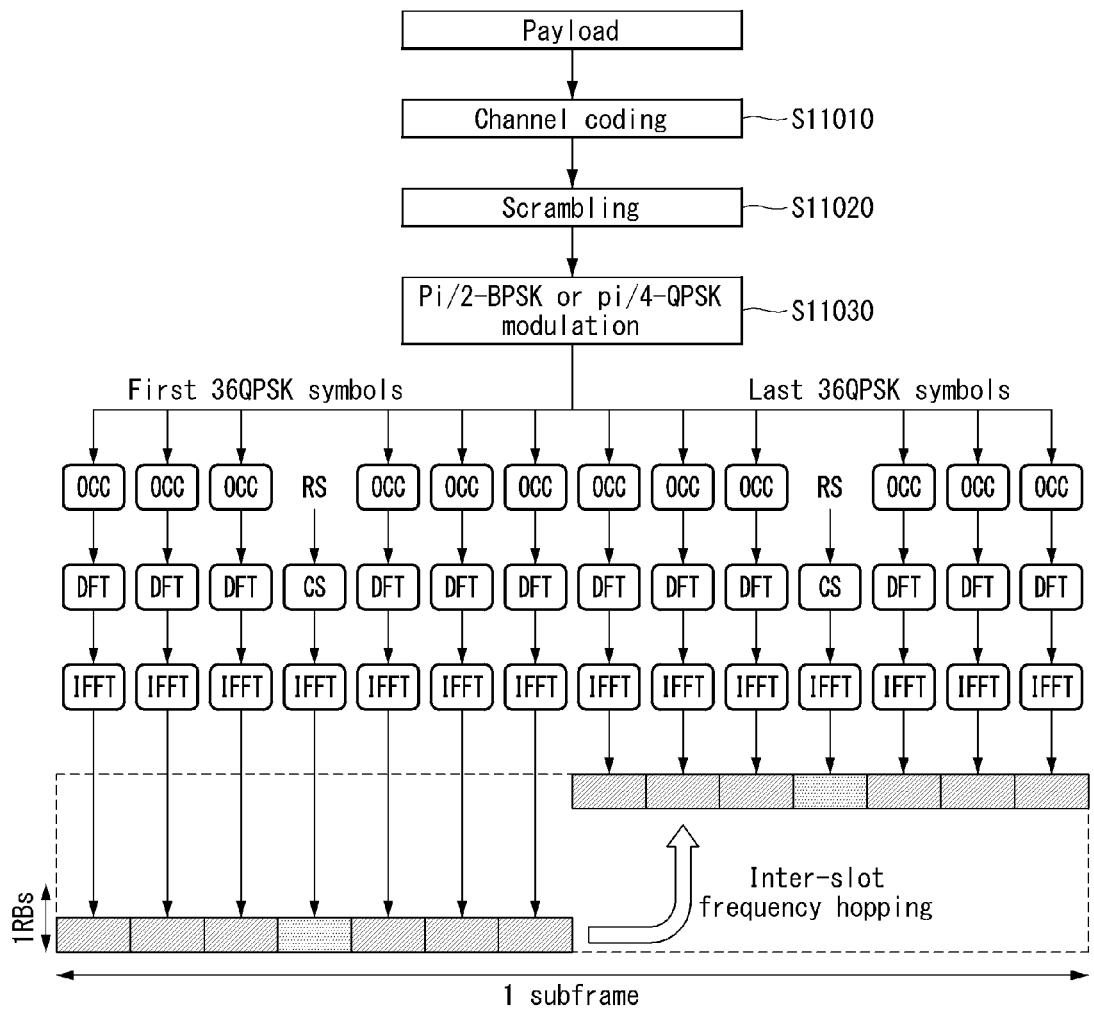

[FIG. 12]
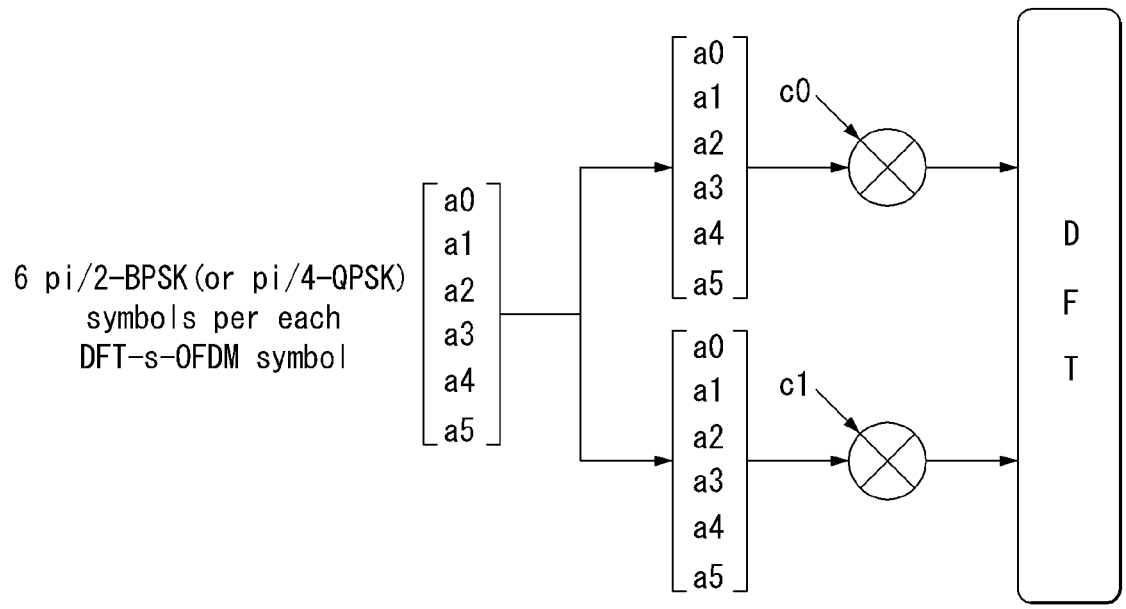
(a)
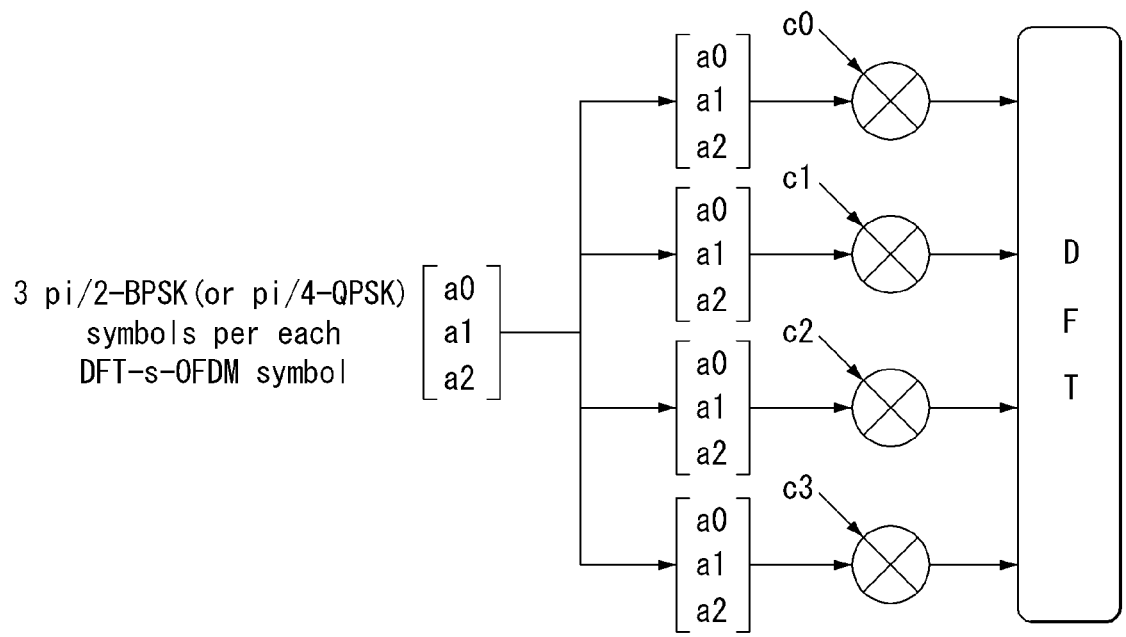
(b)

[FIG. 13]
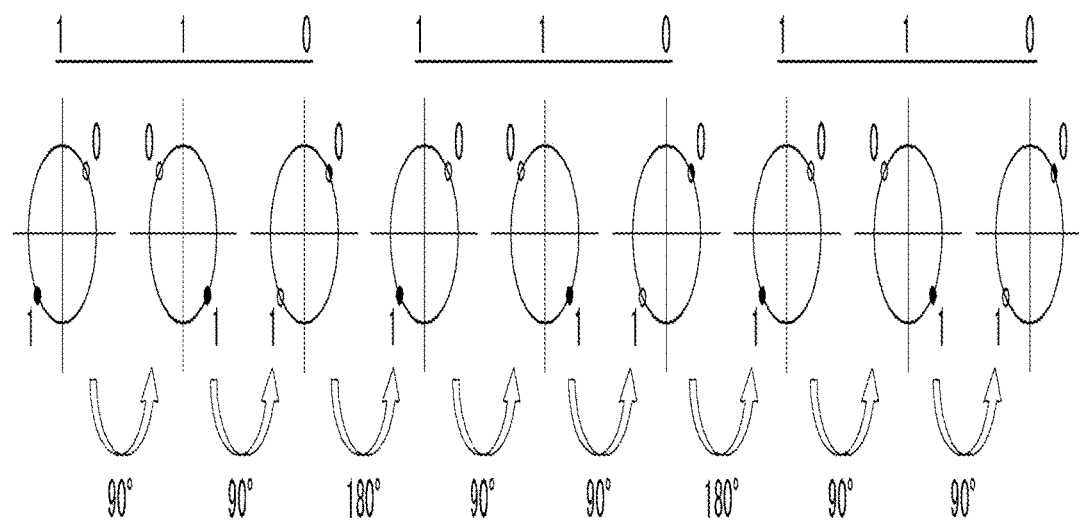

[FIG. 14]
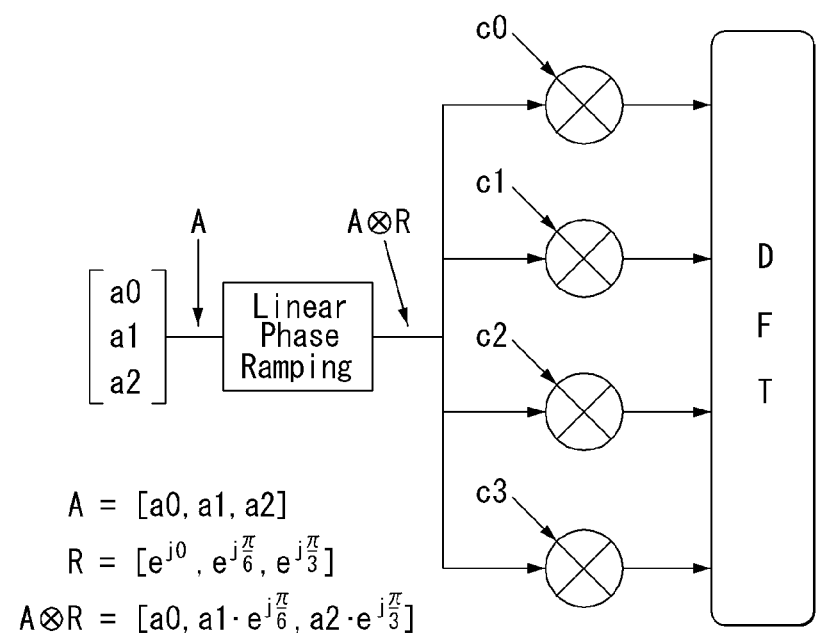

[FIG. 15]
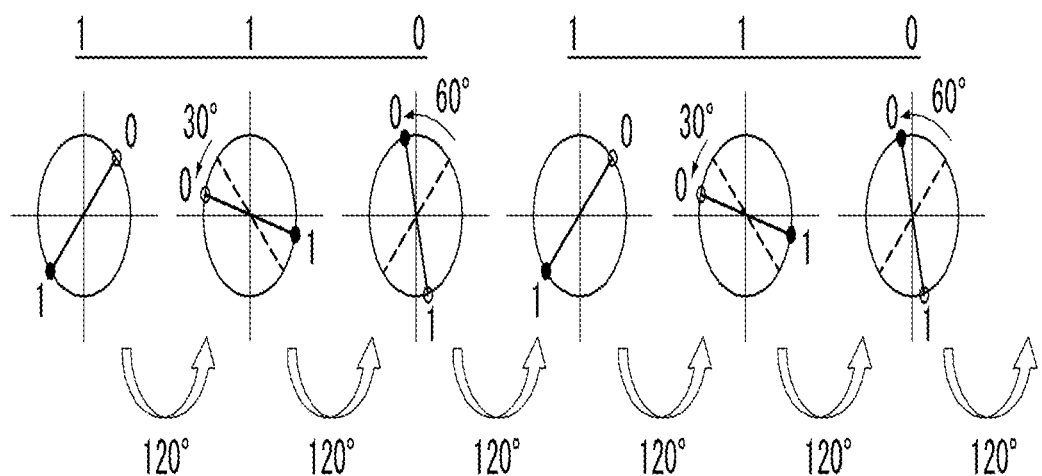

[FIG. 16]
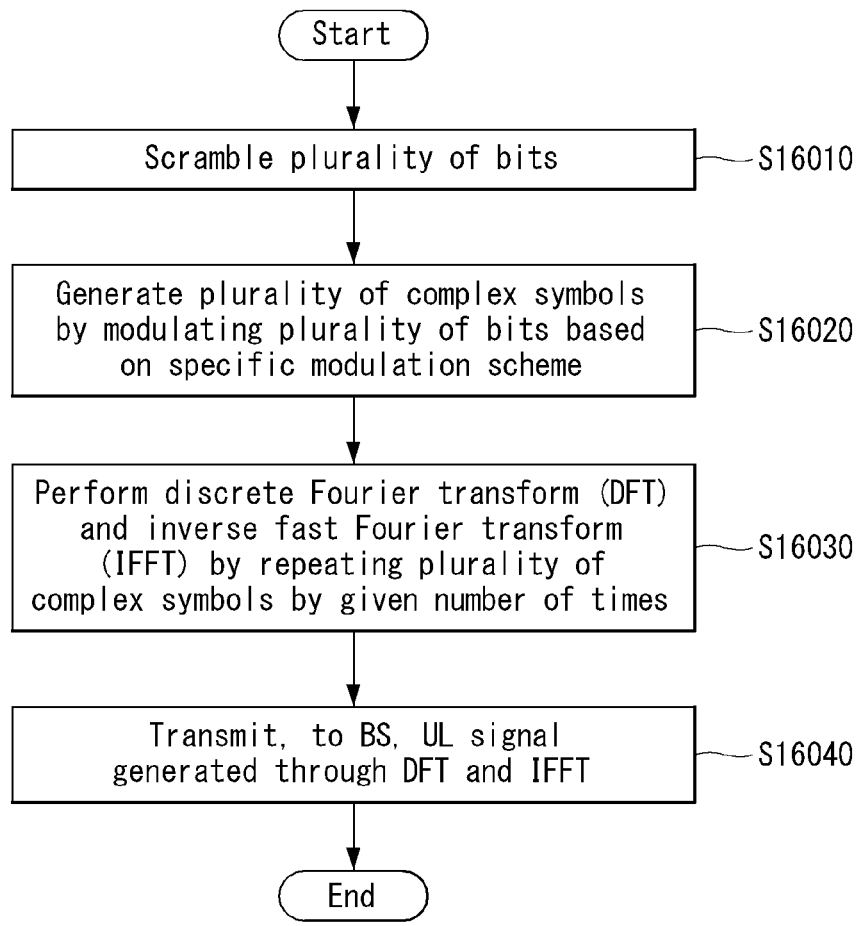
[FIG. 17]
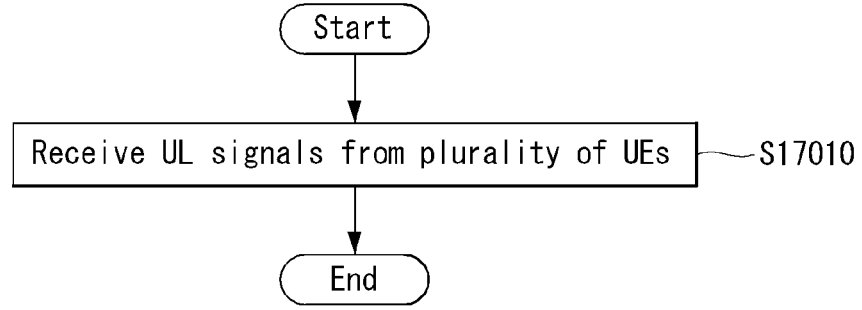

[FIG. 18]
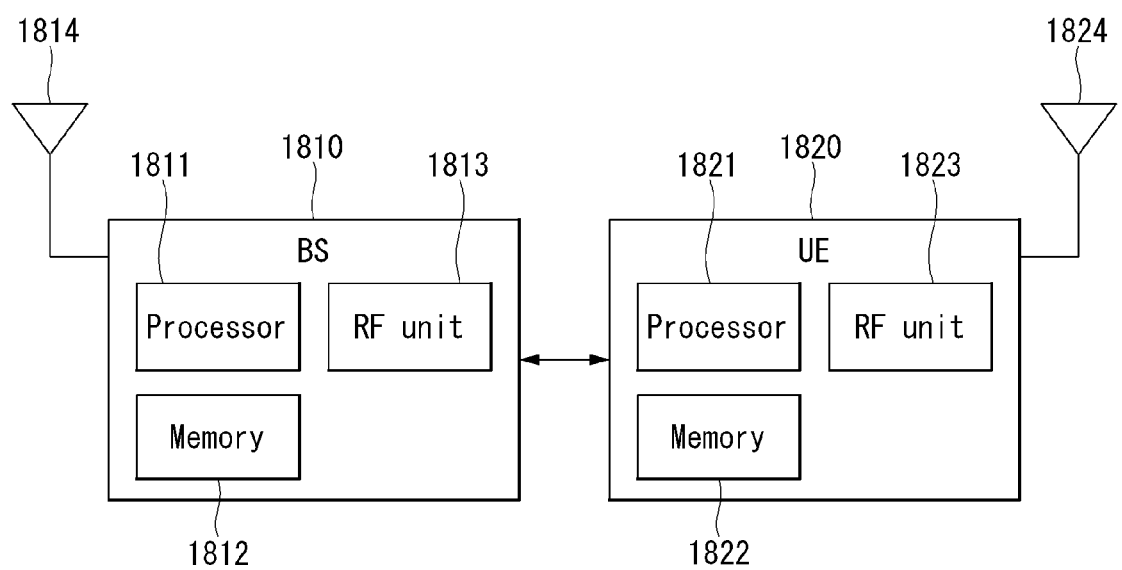

[FIG. 19]
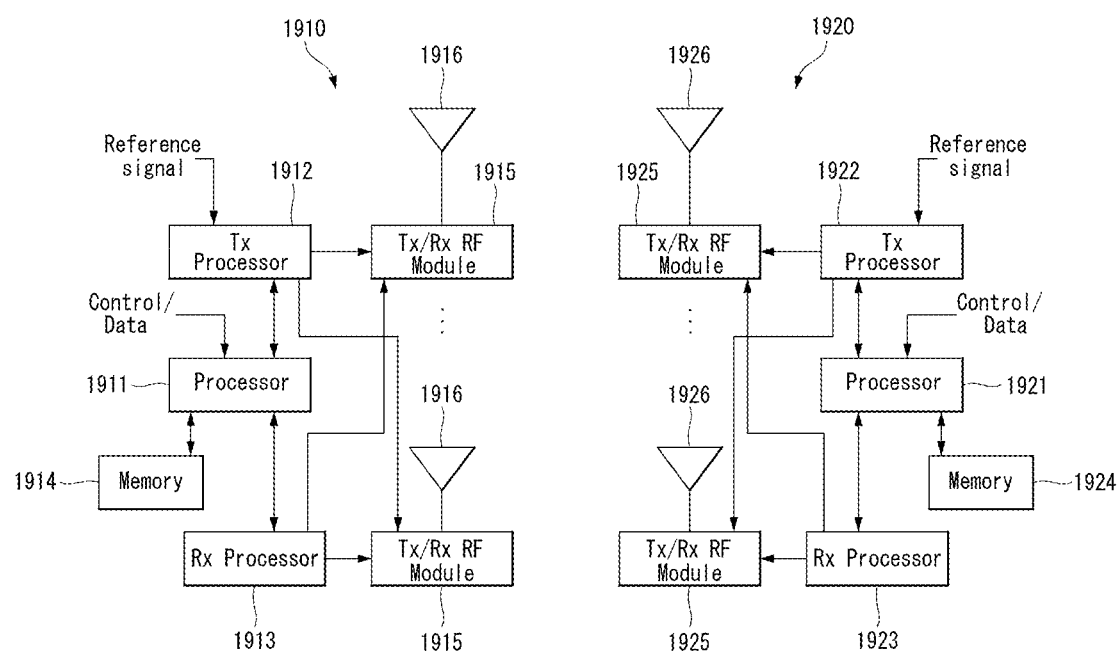

METHOD FOR TRANSMITTING AND RECEIVING UPLINK SIGNAL IN WIRELESS COMMUNICATION SYSTEM, AND APPARATUS THEREFOR

CROSS-REFERENCE TO RELATED APPLICATIONS

This application is a National Stage filing under 35 U.S.C. 371 of International Application No. PCT/KR2019/001853, filed on Feb. 14, 2019, which claims the benefit of U.S. Provisional Application No. U.S. 62/630,337, filed on Feb. 14, 2018, the contents of which are all hereby incorporated by reference herein in their entirety.

TECHNICAL FIELD

The present disclosure relates to a wireless communication system and, more particularly, to a method of transmitting and receiving an uplink signal on a PUCCH or a PUSCH and an apparatus supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method for transmitting an uplink signal on a PUCCH or a PUSCH.

Furthermore, the present disclosure provides a method of ramping (or rotating) the phase of a modulated symbol so that a phase difference between the modulated symbols does not occur by a maximum phase if a plurality of user equipments repeatedly transmits the modulated symbols by applying a modulation scheme for a low peak to average power ratio (PARR).

Furthermore, the present disclosure provides a method of determining a phase value for ramping (or rotating) the phase of a modulated symbol based on the index of the modulated symbol and the number of user equipments for repetition transmission.

Objects of the disclosure are not limited to the foregoing, and other unmentioned objects would be apparent to one of ordinary skill in the art from the following description.

Technical Solution

In the present disclosure, a method for transmitting, by a user equipment, an uplink signal in a wireless communication system is performed by the user equipment, and includes scrambling a plurality of bits for a transmission of the uplink signal, generating a plurality of complex symbols by modulating the plurality of bits based on a specific modulation scheme, performing a discrete Fourier transform (DFT) and an inverse fast Fourier transform (IFFT) by repeating at least one complex symbol of the plurality of complex symbols by a given number of times, and transmitting, to a base station, the uplink signal generated through the DFT and the IFFT, wherein a phase value of the at least one complex symbol is increased or decreased by a specific value based on a symbol index.

Furthermore, in the present disclosure, the specific modulation scheme is π/2-binary phase shift keying (BPSK) or π/4-quadrature phase shift keying (QPSK) for a low peak to average ratio (PAPR).

Furthermore, in the present disclosure, an orthogonal cover code (OCC) is applied to the repeated at least one complex symbol.

Furthermore, in the present disclosure, the specific value is determined based on the number of user equipments multiplexed through the OCC and the symbol index.

Furthermore, in the present disclosure, the specific value x is determined according to an equation below if the number of multiplexed user equipments is M.

$$x = \frac{\frac{\pi}{2}}{\frac{12}{M}}$$

Furthermore, in the present disclosure, the at least one complex symbol is repeatedly transmitted by the number of multiplexed user equipments.

Furthermore, in the present disclosure, the plurality of bits is transmitted using a physical uplink control channel (PUCCH) format 4.

Furthermore, in the present disclosure, a phase between sequences of the OCC has a phase difference of 0 or π.

Furthermore, in the present disclosure, the symbol number of the at least one complex symbol is an odd number.

Furthermore, in the present disclosure, the plurality of bits is randomized through the scrambling.

Furthermore, in the present disclosure, the uplink signal is a physical uplink shared channel (PUSCH) or a physical uplink control channel.

Furthermore, the present disclosure provides a user equipment including a radio frequency (RF) module for transmitting and receiving radio signals and a processor functionally coupled to the RF module, wherein the processor is configured to control to scramble a plurality of bits for a transmission of the uplink signal, control to generate a plurality of complex symbols by modulating the plurality of bits based on a specific modulation scheme, control to perform a discrete Fourier transform (DFT) and an inverse fast Fourier transform (IFFT) by repeating at least one complex symbol of the plurality of complex symbols by a given number of times, and control to transmit, to a base station, the uplink signal generated through the DFT and the IFFT, wherein a phase value of the at least one complex symbol is increased or decreased by a specific value based on a symbol index.

Advantageous Effects

The present disclosure has an effect in that it can efficiently transmit an uplink signal by defining a method for transmitting the uplink signal on a PUCCH or a PUSCH.

Furthermore, the present disclosure has an effect in that it can prevent a maximum phase difference between symbols from occurring due to repetition transmission by ramping (or rotating) the phase of a modulated symbol if a plurality of UEs transmits the modulated symbols by applying a modulation scheme for a low peak to average power ratio (PAPR).

Furthermore, the present disclosure has an effect in that it can maintain a low PAPR by preventing a maximum phase difference between symbols from occurring due to repetition transmission.

Furthermore, the present disclosure has an effect in that it can reduce consumption power by prohibiting an increase of the PAPR.

Effects of the disclosure are not limited to the foregoing, and other unmentioned effects would be apparent to one of ordinary skill in the art from the following description.

DESCRIPTION OF DRAWINGS

A more complete appreciation of the disclosure and many of the attendant aspects thereof will be readily obtained as the same becomes better understood by reference to the following detailed description when considered in connection with the accompanying drawings, wherein:

FIG. 1 is a view illustrating an example overall NR system structure to which a method as proposed in the disclosure may apply.

FIG. 2 illustrates the relationship between an uplink frame and downlink frame in a wireless communication system to which a method as proposed in the disclosure may apply.

FIG. 3 illustrates an example resource grid supported in a wireless communication system to which a method as proposed in the disclosure may apply.

FIG. 4 illustrates examples of antenna ports and a resource grid for each numerology to which a method proposed in the present disclosure may be applied.

FIG. 5 is a diagram illustrating an example of a self-contained slot structure to which a method proposed in the present disclosure may be applied.

FIG. 6 illustrates an example of a component carrier and a carrier aggregation in a wireless communication system to which a method proposed in the present disclosure may be applied.

FIG. 7 illustrates examples of deployment scenarios in which a carrier aggregation in an NR system is taken into consideration.

FIG. 8 is a diagram illustrating an example of a random access procedure to which a method proposed in the present disclosure may be applied.

FIG. 9 is a diagram illustrating an example of a constellation diagram of a modulation scheme to which a method proposed in the present disclosure may be applied.

FIG. 10 is a diagram illustrating an example in which a modulation scheme is applied to an uplink control channel, to which a method proposed in the present disclosure may be applied.

FIG. 11 is a diagram illustrating another example in which a modulation scheme is applied to an uplink control channel, to which a method proposed in the present disclosure may be applied.

FIGS. 12 and 13 are diagrams illustrating examples of a method of multiplexing a plurality of users using an orthogonal cover code (OCC) and corresponding phase changes, to which a method proposed in the present disclosure may be applied.

FIG. 14 is a diagram illustrating an example of a method for preventing a maximum phase difference between symbols from occurring, to which a method proposed in the present disclosure may be applied.

FIG. 15 is a diagram illustrating an example of a phase difference between modulation symbols, to which a method proposed in the present disclosure is applied.

FIG. 16 is a flowchart illustrating an example of an operation method of a UE that performs a method proposed in the present disclosure.

FIG. 17 is a flowchart illustrating an example of an operation method of a BS that performs a method proposed in the present disclosure.

FIG. 18 illustrates a block diagram of a wireless communication apparatus to which methods proposed in the present disclosure may be applied.

FIG. 19 is another example of a block diagram of the wireless communication apparatus to which methods proposed in the present disclosure may be applied.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the disclosure, "base station" means a network terminal node to directly communicate with a user equipment (UE). In the disclosure, a particular operation described to be performed by a base station may be performed by an upper node of the base station in some cases. In other words, in a network constituted of multiple network nodes including the base station, various operations performed to communicate with a UE may be performed by the base station or other network nodes than the base station. "Base station (BS)" may be interchangeably used with the term "fixed station," "Node B," "eNB (evolved-NodeB)," "BTS (base transceiver system)," "AP (Access Point)," or "gNB (next generation NB, general NB, gNodeB)". "Terminal" may refer to a stationary or mobile device and may be interchangeably used with the term "UE (User Equipment)," "MS (Mobile Station)," "UT (user terminal)," "MSS (Mobile Subscriber Station)," "SS (Subscriber Station)," "AMS (Advanced Mobile Station)," "WT (Wireless terminal)," "MTC (Machine-Type Communication) device," "M2M (Machine-to-Machine) device," or "D2D (Device-to-Device) device."

Hereinafter, downlink (DL) means communication from a base station to a terminal, and uplink (UL) means communication between a terminal to a base station. For downlink, a transmitter may be part of a base station, and a receiver may be part of a terminal. For uplink, a transmitter may be part of a terminal, and a receiver may be part of a base station.

The terminology used herein is provided for a better understanding of the disclosure, and changes may be made thereto without departing from the technical spirit of the disclosure.

The following technology may be used in various radio access systems, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented as radio technology, such as IEEE 802.11 (Wi-Fi), IEEE 802.16 (WiMAX), IEEE 802-20, or E-UTRA(evolved UTRA). UTRA is part of UMTS (universal mobile telecommunications system). 3GPP (3rd generation partnership project) LTE(long term evolution) is part of E-UMTS (evolved UMTS) using E-UTRA and adopts OFDMA for downlink and SC-FDMA for uplink. LTE-A (advanced) is an evolution of 3GPP LTE.

5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

5NR supports various subcarrier spacings and supports CP-OFDM on downlink and CP-OFDM and DFT-s-OFDM (SC-OFDM) on uplink.

Embodiments of the disclosure may be supported by the standard documents disclosed in IEEE 802, 3GPP, and 3GPP2 which are radio access systems. In other words, in the embodiments of the disclosure, steps or parts skipped from description to clearly disclose the technical spirit of the disclosure may be supported by the documents. All the terms disclosed herein may be described by the standard documents.

Although the description focuses primarily on 3GPP LTE/LTE-A/NR (New RAT) for clarity, the technical features of the disclosure are not limited thereto.

Terminology eLTE eNB: eLTE eNB is an evolution of eNB supporting connectivity to EPC and NGC.

gNB: A node supporting NR as well as connectivity with NGC.

New RAN: A radio access network interacting with NGC or supporting NR or E-UTRA.

Network slice: A network defined by the operator to provide the optimized solution on a specific market scenario with a specific requirement along with an end-to-end range.

Network function: A logical node in a network infrastructure with a well-defined functional operation and external interface.

NG-C: A control plane interface used at an NG2 reference point between new RAN and NGC.

NG-U: A user plane interface used at an NG3 reference point between new RAN and NGC.

Non-standalone NR: An arrangement in which gNB requires LTE eNB as an anchor for control plane connection to EPC or eLTE eNB as an anchor for control plane connection to NGC.

Non-standalone E-UTRA: An arrangement in which eLTE eNB requires gNB as an anchor for control plane connection to NGC.

User plane gateway: An end point of NG-U interface.

Numerology: this corresponds to one subcarrier spacing in the frequency domain. A different numerology may be defined by scaling a reference subcarrier spacing using an integer N.

NR: NR Radio Access or New Radio

Overview of System

FIG. 1 is a view illustrating an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In connection with the frame structure in the NR system, the size of various fields in the time domain is expressed as a multiple of time unit $T_s=1/(\Delta f_{max} \cdot N_f)$. Here, $\Delta f_{max}=480 \cdot 10^3$, and $N_f=4096$. A downlink and uplink transmission is constituted of a radio frame with a period of $T_f=(\Delta f_{max} N_f/100) \cdot T_s=10$ ms. Here, the radio frame is constituted of 10 subframes each of which has a period of $T_f=(\Delta f_{max} N_f/100) \cdot T_s=1$ ms. In this case, one set of frames for uplink and one set of frames for downlink may exist.

FIG. 2 illustrates the relationship between an uplink frame and downlink frame in a wireless communication system to which a method as proposed in the disclosure may apply.

As shown in FIG. 2, transmission of uplink frame number i from the user equipment (UE) should begin $T_{TA}=N_{TA}T_s$ earlier than the start of the downlink frame by the UE.

For numerology, slots are numbered in ascending order of $n_s^\mu \in \{0, \ldots, N_{subframe}^{slots, \mu}-1\}$ in the subframe and in ascending order of $n_{s,f}^\mu \in \{0, \ldots, N_{frame}^{slots, \mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

All UEs are not simultaneously capable of transmission and reception, and this means that all OFDM symbols of the downlink slot or uplink slot may not be used.

Table 2 illustrates the number of OFDM symbols per slot for a normal CP in the numerology μ. Table 3 illustrates the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In connection with the physical resource in the NR system, antenna port, resource grid, resource element, resource block, and carrier part may be taken into consideration.

Hereinafter, the physical resources that may be considered in the NR system are described in detail.

First, in connection with antenna port, the antenna port is defined so that the channel carrying a symbol on the antenna port may be inferred from the channel carrying another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

FIG. 4 illustrates an example resource grid supported in a wireless communication system to which a method as proposed in the disclosure may apply.

Referring to FIG. 4, although an example is described in which the resource grid is constituted of $N_{RB}^\mu N_{sc}^{RB}$ subcarriers in the frequency domain, and one subframe includes 14·2μ OFDM symbols, embodiments of the disclosure are not limited thereto.

In the NR system, the transmitted signal is described with one or more resource grids constituted of $N_{RB}^\mu N_{sc}^{RB}$ subcarriers and $2^\mu N_{symb}^{(\mu)}$ OFDM symbols. Here, $N_{RB}^\mu \leq N_{RB}^{max,\mu}$. $N_{RB}^{max,\mu}$ refers to the maximum transmission bandwidth, and this may be varied between uplink and downlink as well as numerologies.

In this case, as shown in FIG. 4, one resource grid may be configured per numerology μ and antenna port p.

FIG. 5 illustrates examples of per-antenna port and numerology resource grids to which a method as proposed in the disclosure may apply.

Each element of the resource grid for numerology μ and antenna port p is denoted a resource element and is uniquely identified by index pair (k,l). Here, k=0, . . . , $N_{RB}^\mu N_{sc}^{RB}-1$ is the index in the frequency domain, and l=0, . . . , $2^\mu N_{symb}^{(\mu)}-1$ denotes the position of symbol in the subframe. Upon denoting the resource element) in slot, index pair (k,l) is used. Here, l=0, . . . , $N_{symb}^\mu-1$.

For numerology μ and antenna port, resource element (k, l) corresponds to complex value k,l Where there is no risk of confusion or where a specific antenna port or numerology is not specified, indexes p and μ may be dropped and, as a result, the complex value may become $a_{k,l}^{(p)}$ or $a_{k,l}$.

The physical resource block is defined with $N_{sc}^{RB}=12$ consecutive subcarriers in the frequency domain.

Physical resource blocks are numbered from 0 to $N_{RB}^\mu-1$ on the frequency domain. In this case, a relation between a physical resource block number $n_{PRB}$ and resource elements (k,l) on the frequency domain is given like Equation 1.

$$n_{PRB} = \left\lfloor \frac{k}{N_{sc}^{RB}} \right\rfloor \quad \text{[Equation 1]}$$

Furthermore, in relation to a carrier part, a UE may be configured to perform reception or transmission using only a subset of resource grids. In this case, a set of resource blocks configured to be received or transmitted by the UE is numbered from 0 to $N_{URB}^\mu-1$ on the frequency domain.

Self-Contained Slot Structure

In a TDD system, in order to minimize latency of data transmission, a self-contained slot structure, such as FIG. 5, is considered in a 5G New RAT (NR).

That is, FIG. 5 is a diagram illustrating an example of a self-contained slot structure to which a method proposed in the present disclosure may be applied.

In FIG. 5, a slashed area 510 indicates a downlink control region, and a dark portion 520 indicates an uplink control region.

A portion 530 not including any indication may be used for downlink data transmission or may be used for uplink data transmission.

In the characteristics of such a structure, DL transmission and UL transmission may be sequentially performed within one slot, and DL data may be transmitted and UL Ack/Nack may be transmitted and received within one slot.

Such a slot may be defined as a "self-contained slot."

That is, through such a slot structure, a BS can reduce the time taken for data retransmission to a UE when a data transmission error occurs, and thus can minimize latency of the final data transmission.

In such a self-contained slot structure, a BS and a UE require a time gap for a process of switching from a transmission mode to a reception mode or a process of switching from the reception mode to the transmission mode.

To this end, in the corresponding slot structure, some OFDM symbols at timing at which DL switches to UL may be configured as a guard period (GP).

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 6 illustrates examples of a component carrier and carrier aggregation in the wireless communication system to which the present invention can be applied.

FIG. 6a illustrates a single carrier structure used in an LTE system. The component carrier includes the DL CC and the UL CC. One component carrier may have a frequency range of 20 MHz.

FIG. 6b illustrates a carrier aggregation structure used in the LTE system. In the case of FIG. 6b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

If a UE is configured with one or more S cells, a network may activate or deactivate the configured S cell(s). A P cell is always activated. The network activates or deactivates the S cell(s) by transmitting an activation/deactivation MAC control element.

The activation/deactivation MAC control element has a fixed size, and is configured with a single octet including 7 C-fields and 1 R-field. The C-field is configured for each S cell index (SCellIndex), and indicates the activation/deactivation state of an S cell. When a C-field value is set to "1", it indicates the activation of an S cell having a corresponding S cell index. When the C-field value is set to "0", it indicates the deactivation of an S cell having a corresponding S cell index.

Furthermore, the UE maintains a timer (sCellDeactivationTimer) for each configured S cell, and deactivates a related S cell until the timer expires. The same initial timer value is applied to each instance of the timer (sCellDeactivationTimer), and is set by RRC signaling. When an S cell(s) is added or after handover, an initial S cell(s) is in a deactivated state.

A UE performs the following operation on each configured S cell(s) in each TTI.

When receiving an activation/deactivation MAC control element that activates an S cell in a specific TTI (subframe n), the UE activates the S cell in a TTI (subframe n+8 or thereafter) corresponding to predetermined timing, and (re)starts a timer related to the corresponding S cell. What the UE activates the S cell means that the UE applies a normal S cell operation, such as sounding reference signal (SRS) transmission on the S cell, a channel quality indicator (CQI)/precoding matrix indicator (PMI)/rank indication (RI)/precoding type indicator (PTI) report for the S cell, PDCCH monitoring on the S cell, and PDCCH monitoring for the S cell.

When the UE receives an activation/deactivation MAC control element that deactivates an S cell in a specific TTI (subframe n) or a timer related to a specific TTI (subframe n) activated S cell expires, the UE deactivates the S cell in a TTI (subframe n+8 or thereafter) corresponding to predetermined timing, stops the timer of the corresponding S cell, and flushes the entire HARQ buffer related to the corresponding S cell.

When a PDCCH on an activated S cell indicates an uplink grant or a downlink assignment or a PDCCH on a serving cell that schedules an activated S cell indicates an uplink grant or downlink assignment for the activated S cell, the UE restarts a timer related to the corresponding S cell.

When an S cell is deactivated, the UE does not transmit an SRS on the S cell, does not report a CQI/PMI/RI/PTI for the S cell, does not transmit an UL-SCH on the S cell, and does not monitor a PDCCH on the S cell.

The aforementioned contents of the carrier aggregation have been described based on the LTE/LTE-A system, but this is merely for convenience of description and may be similarly extended and applied to the 5G NR system. In particular, carrier aggregation deployment scenarios taken into consideration in the 5G NR system may be the same as those of FIG. 7.

FIG. 7 illustrates examples of deployment scenarios in which a carrier aggregation in an NR system is taken into consideration.

Referring to FIG. 7, F1 and F2 may mean a cell configured with a first frequency (or a first frequency band, a first carrier frequency, or a first center frequency) and a cell configured with a second frequency (or a second frequency band, a second carrier frequency or a second center frequency).

(a) of FIG. 7 illustrates a first CA deployment scenario. As illustrated in (a) of FIG. 7, the F1 cell and the F2 cell may be co-located or overlaid. In this case, both the two layers may provide sufficient coverage, and mobility in the two layers may be supported. The corresponding scenario may include a case where the F1 cell and the F2 cell are present in the same band. In the corresponding scenario, it may be expected that an aggregation between the overlapped F1 cell and F2 cell will be possible.

(b) of FIG. 7 illustrates a second CA deployment scenario. As illustrated in (b) of FIG. 7, the F1 cell and the F2 cell may be co-located, but the F2 cell may support smaller coverage due to a larger path loss. In this case, only the F1 cell provides sufficient coverage, and the F2 cell may be used to improve the throughput. In this case, mobility may be performed based on the coverage of the F1 cell. The corresponding scenario may include a case where the F1 cell and the F2 cell are present in different bands (e.g., the F1 cell is {800 MHz, 2 GHz}, the F2 cell is {3.5 GHz}). In the corresponding scenario, it may be expected that an aggregation between the overlapped F1 cell and F2 cell will be possible.

(c) of FIG. 7 illustrates a third CA deployment scenario. As illustrated in (c) of FIG. 7, the F1 cell and the F2 cell are co-located, but the antenna of the F2 cell may be connected to the boundary of the F2 cell in order to increase the throughput of a cell boundary. In this case, the F1 cell provides sufficient coverage, but the F2 cell may have a hole attributable to a potentially greater path loss. In this case, mobility may be performed based on the coverage of the F1 cell. The corresponding scenario may include a case where the F1 cell and the F2 cell are present in different bands (e.g., the F1 cell is {800 MHz, 2 GHz}, the F2 cell is {3.5 GHz}). In the corresponding scenario, it may be expected that an aggregation between the F1 cell and F2 cell of the same BS (eNB) will be possible in a region where coverages overlap.

(d) of FIG. 7 illustrates a fourth CA deployment scenario. As illustrated in (d) of FIG. 7, the F1 cell provides macro coverage, and F2 remote radio heads (RRHs) may be used for throughput improvements in a hot spot. In this case, mobility may be performed based on coverage of the F1 cell. The corresponding scenario may include both a case where the F1 cell and the F2 cell correspond to a DL non-contiguous carrier in the same band (e.g., 1.7 GHz) and a case where the F1 cell and the F2 cell are present in different bands (e.g., the F1 cell is {800 MHz, 2 GHz}, the F2 cell is {3.5 GHz}). In the corresponding scenario, it may be expected that the F2 cells (i.e., RRHs) may be aggregated with the F1 cell (i.e., a macro cell)(s) connected therewith (underlying).

(e) of FIG. 7 illustrates a fifth CA deployment scenario. The corresponding scenario is similar to the second CA deployment scenario, but frequency selective repeaters may be deployed in order to extend coverage for one of carrier frequencies. In the corresponding scenario, it may be expected that the F1 cell and F2 cell of the same BS may be aggregated in a region where coverages overlap.

A reception timing difference (e.g., dependent on the number of control symbols, propagation and a deployment scenario) in the physical layer of UL grants and DL assignments for the same TTI, although it is based on different serving cells may not be affected by a MAC operation. A UE may need to process a relative propagation delay difference up to 30 us among CCs to be aggregated in both an intra-band non-contiguous CA and an inter-band non-contiguous CS. This may mean that since time alignment of a BS is specified as a maximum of 0.26 us, a UE may need to process delay spread up to 30.26 us among CCs monitored in a receiver. Furthermore, this may mean that a UE has to process a maximum UL transmission timing difference between TAGs of 36.37 us with respect to an inter-band CA having multiple TAGs.

If a CA is deployed, frame timing and a system frame number (SFN) may be arranged in aggregated cells.

FIG. 8 is a diagram illustrating an example of a random access procedure to which a method proposed in the present disclosure may be applied.

A random access process is performed when initial access in RRC_IDLE occurs, initial access after a radio link failure occurs, handover that requires a random access process occurs, or UL or DL data that requires a random access process during RRC_CONNECTED occurs. Some RRC messages, such as a RRC connection request message, a cell update message, and an UTRAN registration area (URA) update message, are transmitted using a random access process. A logical channel common control channel (CCCH), a dedicated control channel (DCCH), or a dedicated traffic channel (DTCH) may be mapped to a transmission channel RACH. The transmission channel RACH is mapped to a physical channel physical random access channel (PRACH).

If the MAC layer of a UE indicates PRACH transmission in a UE physical layer, the UE physical layer first selects one access slot and one signature and transmits a PRACH preamble in the uplink. A random access process is divided into a contention-based random access process and a non-contention based random access process.

(a) of FIG. 8 illustrates an example of a contention-based random access process. (b) of FIG. 8 illustrates an example of a non-contention based random access process.

First, the contention-based random access process is described with reference to (a) of FIG. 8.

A UE receives information on random access from a BS through system information and stores the information. Thereafter, if random access is necessary, the UE transmits a random access preamble (also called a message 1) to the BS (S8010).

When receiving the random access preamble from the UE, the BS transmits a random access response message (also called a message 2) to the UE (S8020). Specifically, downlink scheduling information for the random access response message may be CRC-masked as a random access-radio network temporary identifier (RA-RNTI) and transmitted on an L1 or L2 control channel (PDCCH). The UE that has received a downlink scheduling signal masked as the RA-RNTI may receive the random access response message from a physical downlink shared channel (PDSCH) and decode the random access response message. Thereafter, the UE checks whether random access response information indicated therefor is present in the random access response message.

Whether the random access response information indicated therefor is present may be checked by checking whether a random access preamble ID (RAID) for a preamble transmitted by the UE is present.

The random access response information includes timing alignment (TA) indicating of timing offset information for synchronization, radio resource assignment information used for the uplink, a temporary identifier (e.g., Temporary C-RNTI) for identifying the UE, etc.

When receiving the random access response information, the UE performs uplink transmission (also represented as a message 3) through an uplink shared channel (USC) based on the radio resource assignment information included in the response information (S8030). In this case, the uplink transmission may be represented as scheduled transmission.

After receiving the uplink transmission from the UE, the BS transmits a message (also represented as a message 4) for a contention resolution to the UE through a downlink shared channel (DL-SCH) (S8040).

A non-contention-based random access process is described with reference to (b) of FIG. 8.

A BS assigns a non-contention random access preamble to a UE before the UE transmits a random access preamble (S8110).

The non-contention random access preamble may be assigned through a handover command or dedicated signaling, such as a PDCCH. When the non-contention random access preamble is assigned, the UE transmits a non-contention random access preamble to the BS (S8120).

Thereafter, similar to step S8020 in the contention-based random access process, the BS may transmit a random access response (also represented as a message 2) to the UE (S8130).

In the aforementioned random access process, an HARQ is not applied to a random access response, but an HARQ may be applied to uplink transmission for a random access response or a message for a contention resolution. Accordingly, the UE does not need to transmit ACK or NACK for the random access response.

PRACH formats now supported in LTE are the same as those of Table 4 below.

TABLE 4

| Preamble format | CP duration (us) | GT duration (us) | Max. delay spread (us) | Max. cell radius (km) |
|---|---|---|---|---|
| 0 | 103.1 | 96.88 | 6.3 | 14.5 |
| 1 | 684.4 | 515.6 | 16.7 | 77.3 |
| 2 | 203.1 | 196.9 | 6.3 | 29.5 |
| 3 | 684.4 | 715.6 | 16.7 | 100.2 |

FIG. 9 is a diagram illustrating an example of a constellation diagram of a modulation scheme to which a method proposed in the present disclosure may be applied.

In the NR system, in order to generate a low PAPR wave form, a pi/2-BPSK or pi/4-QPSK modulation scheme may be supported instead of the existing binary phase shift keying (BPSK) or quadrature phase shift keying (QPSK) modulation scheme.

A common BPSK and QPSK modulation scheme may increase the band of a transmission signal because it permits a sudden change (e.g., 180 degrees) of a phase between modulation symbols. Accordingly, the PAPR is increased and thus a required system linearity and dynamic range may be increased.

In contrast, the pi/2-BPSK and pi/4-QPSK modulation schemes can reduce an increase of the band of a transmission signal and the PAPR compared to the BPSK and QPSK modulation schemes by limiting changes of maximum phases between modulation symbols to 90 degrees and 135 degrees, respectively.

Furthermore, there are effects in that efficiency of a PA can be increased and thus consumed energy can be reduced.

(a) of FIG. 9 illustrates an example of a constellation diagram of the pi/2-BPSK.

In the case of the pi/2-BPSK modulation scheme, an input bit b(i) may be mapped to a complex-valued modulation symbol d(i) according to Equation 2 below.

$$d(i) = \frac{e^{j\frac{\pi}{2}(i \bmod 2)}}{\sqrt{2}}[(1-2b(i)) + j(1-2b(i))] \quad \text{[Equation 2]}$$

In (a) of FIG. 9, the left side illustrates a constellation diagram when i in Equation 2 is even, and the right side illustrates a constellation diagram when i in Equation 2 is odd.

As illustrated in (a) of FIG. 9, a change of a maximum phase between symbols in pi/2-BPSK may be limited to 90 degrees.

(b) of FIG. 9 illustrates an example of a constellation diagram of the pi/4-QPSK.

In the case of the pi/4-QPSK modulation scheme, two input bits b(i) and b(i+1) may be mapped to one complex value modulation symbol d(i) according to Equation 3 below.

$$d(i) = \frac{e^{j\frac{\pi}{4}(i \bmod 2)}}{\sqrt{2}}[(1-2b(i)) + j(1-2b(i+1))] \quad \text{[Equation 3]}$$

In (b) of FIG. 9, the left side illustrates a constellation diagram when i in Equation 3 is even, and the right side illustrates a constellation diagram when i in Equation 3 is odd.

FIG. 10 is a diagram illustrating an example in which a modulation scheme is applied to an uplink control channel, to which a method proposed in the present disclosure may be applied.

A low PAPR wave form may be applied to uplink transmission. For example, the low PAPR wave form may be applied to a physical uplink shared channel (PUSCH), that is, an uplink data channel, and/or a PUCCH, that is, an uplink control channel.

FIG. 10 illustrates an example in which a modulation scheme (e.g., pi/2-BPSK, pi/4-QPSK) for a low PAPR is applied to a specific physical uplink control channel format (e.g., LTE PUCCH format 4).

In FIG. 10, a transverse axis is illustrated as one subframe configured with 14 (DFT-s-) OFDM symbols, and means a time axis.

A longitudinal axis means a frequency axis, and a scale illustrates one RB unit.

Furthermore, FIG. 10 illustrates a case where a specific physical uplink control channel format occupies 3 RBs and frequency hopping is performed in a slot boundary.

As illustrated in FIG. 10, specific bits (e.g., uplink control information (UCI) payload bits)) for transmitting an uplink signal may be input as channel coding (S10010).

Output bits coded through the channel coding may be inter-cell interference randomized through a scrambling process (S10020).

Thereafter, the input bits may be mapped to a plurality of complex symbols (modulation symbols) based on a modulation scheme described with reference to FIG. 9 (S10030).

The plurality of complex symbols may be transformed into a time axis signal through 12-discrete Fourier transform (DFT) spreading, RE mapping (resource mapping) and an inverse fast Fourier transform (IFFT) process.

The transformed signal can maintain a low PAPR characteristic.

FIG. 11 is a diagram illustrating another example in which a modulation scheme is applied to an uplink control channel, to which a method proposed in the present disclosure may be applied.

A modulation scheme for a low PAPR described with reference to FIGS. 9 and 10 may be applied to a specific physical uplink control channel format (e.g., NR PUCCH format 4 or LTE PUCCH format 5).

FIG. 11 illustrates an example of a basic structure of an NR PUCCH format 4 or an LTE PUCCH format 5.

Compared to the structure described with reference to FIG. 10, there is a difference in that multiplexing is performed using an orthogonal cover code (OCC) prior to a DFT process in order to support multi-user multiplexing.

Hereinafter, in the present disclosure, multiplexing using an OCC is called pre-DFT OCC multiplexing.

Furthermore, in the structure of FIG. 10, transmission is performed through multiple RBs. In contrast, in the structure of FIG. 11, transmission may be performed through only one RB.

A pre-DFT OCC multiplexing operation is described below.

FIGS. 12 and 13 are diagrams illustrating examples of a method of multiplexing a plurality of users using an orthogonal cover code (OCC) and corresponding phase changes, to which a method proposed in the present disclosure may be applied.

(a) of FIG. 12 illustrates an example of a method of multiplexing 2 users (or UEs) through an OCC prior to a DFT process in uplink transmission, and (b) of FIG. 12 illustrates an example of a method of multiplexing 4 users (or UEs) through an OCC prior to a DFT process.

The 2-user multiplexing method through an OCC may be implemented identically or similar to the method illustrated in (a) of FIG. 12.

In this case, a given number of complex symbols (e.g., UCI modulation symbols) may be repeatedly transmitted based on the number of multiplexed UEs.

For example, as illustrated in (a) of FIG. 12, when input bits are mapped to 12 complex symbols through a modulation process and 2 UEs are multiplexed through an OCC, 6 complex symbols may be repeatedly transmitted.

That is, the number of complex symbols transmitted per 1 RB and per 1 symbol is 12/M. In this case, M means the number of multiplexed UEs.

In pre-DFT OCC multiplexing, 6 complex symbols may be received and repeatedly performed M times. After each of the repeated 6 complex symbols is multiplied by c0 and c1, DFT may be performed.

In this case, if an OCC sequence vector is represented as c, C=[c0, c1] may indicate each element of an OCC sequence set {[+1, +1], [−1, −1]} for multiplexing.

(b) of FIG. 12 illustrates an example of pre-DFT OCC multiplexing if multiplexing between 4 UEs is supported.

Referring to FIG. 12, in order to support multiplexing between 4 UEs, 3 complex symbols per 1 RB may be repeatedly transmitted.

In this case, the number of complex symbols transmitted per 1 RB and per 1 symbol may be 3. Accordingly, in pre-DFT OCC multiplexing, 3 complex symbols may be received and repeatedly performed 4 times. After each of the repeated 3 complex symbols is multiplied by c0, c1, c2 and c3, that is, OCC sequence vectors, DFT may be performed.

If an OCC sequence vector for multiplexing between 4 UEs is represented as C, C=[c0, c1, c2, c3] may be a Hadamard sequence or a DFT sequence.

In this case, if a DFT-series sequence is applied, c0, c1, c2 or c3 may be one element of a set of OCC sequences in Equation 4.

$$C=[c0,c1,c2,c3]\in\{[+1, +1, +1, +1], [+1, -j, -1, +j],$$
$$[+1, -1, +1, -1], [+1, +j, -1, -j]\} \quad \text{[Equation 4]}$$

An index m may be defined as an index to identify an OCC sequence vector within the OCC sequence set based on the sequence.

For example, c0=[+1, +1, +1, +1], c1=[+1, −j, −1, +j], c2=[+1, −1, +1, −1]로 may be represented 있다.

As illustrated in FIG. 12, in the case where 3 complex symbols A=[a0, a1, a2] are repeatedly transmitted in order to support multiplexing (M=4) between 4 UEs (or users), if multiplexing between a plurality of UEs is performed through an OCC sequence vector whose OCC index m is "0" or "2", a phase difference between the repeated complex symbols may not be constant.

Accordingly, if multiplexing between a plurality of UEs is performed through an OCC sequence vector having a specific OCC index value, the PAPR may increase.

Specifically, if [a0, a1, a2], that is, a complex symbol sequence A, is modulated through based on the pi/2-BPSK modulation scheme, 4 UEs are multiplexed, and A is repeated four times, a signal output after the repetition may be represented like Equation 5 below.

$$AAAA=a0,a1,a2,a0,a1,a2,a0,a1,a2,a0,a1,a2 \quad \text{[Equation 2]}$$

In the repeated and output signal, elements may be multiplied by the vectors of Equation 6 according to an OCC index m through point-by-point multiplication.

For example, if m is "0", a signal output through a multiplexing process may be the same as Equation 5.

In this case, if the complex symbols modulated based on the pi/2-BPSK modulation scheme described with reference to (a) of FIG. 9 are repeated, a case where a phase difference between symbols is greater than 90 degrees limited based on the pi/2-BPSK modulation scheme may occur.

Specifically, if m is "1" or "3", when a phase difference between the elements of an OCC sequence vector is ±pi/2, a phase difference between the complex symbols of a repeated boundary may be always limited to ±pi/2.

That is, if a phase difference between c0 and c1 and between c1 and c2 is ±pi/2, a phase difference between complex symbols may be always limited to ±pi/2.

However, as illustrated in FIG. 13, if m is "0" and complex symbols modulated based on the pi/2-BPSK modulation scheme are repeated, a phase relation between the complex symbols of a repeated boundary may be the same.

That is, a case where i values of the complex symbols of the repeated boundary are the same as an odd number or an even number may occur. In this case, a phase difference between the complex symbols may have a maximum phase difference greater than 90 degrees limited based on the pi/2-BPSK modulation scheme.

Accordingly, repetition transmission through an OCC has a problem in that the PAPR is increased.

Such a problem may also occur when m is "2." That is, if a phase difference between the elements of an OCC sequence vector is 0 degree or 180 degrees, there is a problem in that the PAPR may be increased because a maximum phase difference occurs due to repetition transmission.

Accordingly, in order to solve such a problem, the present disclosure proposes a method of increasing or decreasing a phase value of a complex symbol by a specific value if a maximum phase difference occurs between the complex symbols.

That is, there is proposed a phase ramping or phase rotation method for changing a phase value of a symbol by a specific value.

FIG. 14 is a diagram illustrating an example of a method for preventing a maximum phase difference between symbols from occurring, to which a method proposed in the present disclosure may be applied.

Referring to FIG. 14, if complex symbols modulated based on a modulation scheme for a low PAPR are repeatedly transmitted through an OCC sequence vector, an increase of the PAPR can be prevented by increasing or decreasing phase values of the modulated complex symbols based on a symbol index and the number of multiplexed UEs.

Specifically, input bits for transmitting an uplink signal in a specific physical downlink channel format may be modulated based on a modulation scheme for a low PAPR, and may be mapped to a plurality of complex symbols.

In this case, if the plurality of complex symbols is repeatedly transmitted using a multiplexing method through an OCC, in order to prevent a maximum phase difference from occurring at the boundary of the repeatedly transmitted symbols, a phase ramping or phase rotation method for increasing or decreasing a phase value of each of the complex symbols by a specific value based on a symbol index and the number of multiplexed UEs may be applied to each of the complex symbols.

For example, if a low PAPR modulation scheme (e.g., pi/2-BPSK or pi/4-QPSK) is configured in the NR PUCCH format 4, a phase value of each symbol may be increased or decreased so that a phase difference between symbols does not occur by a maximum phase value through the phase ramping or phase rotation method.

That is, as illustrated in FIG. 14, if the number of multiplexed UEs is 4 (4 user multiplexing) and an OCC index m is configured as an "0" or "2" (i.e., in the case of an OCC sequence vector configured with elements having a 0 degree or 180 degree phase difference) described with reference to FIG. 13, the phase ramping or phase rotation method may be applied in order to increase or decrease a phase by a specific value as a symbol index i is increased before the UEs are multiplexed through an OCC with respect to a complex symbol sequence A=[a0, a1, a2] configured with 3 symbols.

In this case, the specific value x may be calculated through Equation 6 below.

$$x = \frac{\frac{\pi}{2}}{\frac{12}{M}}$$ [Equation 6]

In Equation 6, M means the number of multiplexed UEs.

Or, as illustrated in FIG. 14, the phase value may be increased or decreased by multiplying elements of a specific vector R for phase ramping or phase rotation with respect to A.

That is, linear phase ramping (or linear phase rotation) may be performed by performing point-by-point multiplication on the vector A and the vector R.

In this case, R may be the same as Equation 7 below.

$$R = \left[ e^{j0},\ e^{j\frac{\pi}{12}},\ e^{j\frac{\pi}{6}} \right]$$ [Equation 7]

In this case, if an operator of point-by-point multiplication is defined as ⊗, a linear phase ramping (or linear phase rotation) output signal AR may be represented like Equation 8.

$$AR = A \otimes R = \left[ a0,\ a1 \cdot e^{j\frac{\pi}{12}},\ a2 \cdot e^{j\frac{\pi}{6}} \right]$$ [Equation 8]

The output signal AR may be the input of a pre-DFT OCC for multiplexing between a plurality of UEs, as illustrated in FIG. 14.

As another embodiment of the present disclosure, a phase change of a symbol through linear phase ramping (or linear phase rotation) may be applied to a plurality of symbols repeated and generated through a pre-DFT OCC process for multiplexing between a plurality of UEs.

For example, a maximum phase difference between repeated symbols may be prevented from occurring by multiplying vector RRRRs for linear phase ramping (or linear phase rotation) by a plurality of complex symbols AAAA=[a0, a1, a2, a0, a1, a2, a0, a1, a2, a0, a1, a2] repeated through a pre-DFT OCC.

In this case, the vector RRRR may be the same as Equation 9 below.

$$RRRR = \left[ e^{j0}, e^{j\frac{\pi}{12}}, e^{j\frac{\pi}{6}}, e^{j0}, e^{j\frac{\pi}{12}}, e^{j\frac{\pi}{6}}, e^{j0}, e^{j\frac{\pi}{12}}, e^{j\frac{\pi}{6}}, e^{j0}, e^{j\frac{\pi}{12}}, e^{j\frac{\pi}{6}} \right]$$

As described above, if a modulation scheme for a low PAPR is applied by increasing or decreasing the phase of each of modulated symbols by a specific value, when a plurality of complex symbols modulated using an OCC for multiplexing between a plurality of UEs is repeatedly transmitted, an increase of the PAPR attributable to the occurrence of a maximum phase difference between symbols of a boundary that are repeatedly transmitted can be prevented.

FIG. 15 is a diagram illustrating an example of a phase difference between modulation symbols, to which a method proposed in the present disclosure is applied.

Referring to FIG. 15, if the phase of a repeatedly transmitted symbol is increased or decreased by a specific value using the method described with reference to FIG. 14, a maximum phase difference may not occur between symbols located at the boundary of the repeated symbol.

Specifically, in FIG. 14, if input bits for transmitting an uplink signal are modulated based on the pi/4-QPSK modulation scheme and 4 UEs are multiplexed through an OCC and repeated by a symbol sequence A=[a0, a1, a2] and transmitted, a phase value of each symbol may be increased or decreased by a specific value so that a maximum phase difference between symbols does not occur.

For example, as illustrated in FIG. 15, a phase value of each symbol of A=[a0, a1, a2] may be increased by 30 degrees according to Equation 6 based on an index value of the symbol.

That is, the phases of a0, a1, and a2 may be increased or decreased by 0 degree, 30 degrees, and 60 degrees, respectively. In this case, as illustrated in FIG. 15, a phase between symbols has a difference of a certain value (120 degrees).

In particular, a phase difference between a2 and a0, that is, the symbols of the repeated boundary is 120 degrees not 180 degrees, that is, a maximum phase difference value.

Accordingly, since a phase difference between symbols does not occur by a maximum phase difference value, the PAPR is not increased and a low PAPR can be maintained although a plurality of complex symbols modulated based on the pi/2-BPST or pi/4-QPSK modulation scheme is multiplexed and repeatedly transmitted through pre-DFT OCC multiplexing.

Such a method may be used to decrease the PAPR, if a modulation symbol sequence having a length L (when L is an odd number) to which a low PAPR modulation scheme (e.g., pi/2-BPSK, pi/4-QPSK) has been applied is repeatedly transmitted.

If a phase diffraction angle between neighbor modulation symbols applied in such a low PAPR modulation scheme is 9, the value 9 may be 90 degrees in pi/2-BPSK and 45 degrees in pi/4-QPSK.

In this case, in order to prevent a phase difference between repeatedly transmitted symbols from occurring by a maximum phase difference value, a linear phase ramping or linear phase rotation method for increasing or decreasing, by θ/L, a phase value of each symbol based on a modulation symbol index i(i=0, 1, 2, . . . , L−1) may be applied to a modulation symbol sequence having a length L, that is, a repetition transmission unit in which a demodulation symbol is repeated and transmitted.

Such a linear phase ramping or linear phase rotation method may be applied to if the number of symbols included in the vector of a repeated modulation symbol is an odd number in the NR PUCCH format 4 and a phase difference between the elements of an OCC sequence vector is 0 degree or 180 degrees.

In this case, the example of the NR PUCCH format 4 may be applied to a specific case where L=12/M.

The methods described with reference to FIGS. 14 and 15 may be identically applied to a case of DFT-s-OFDM whose properties identical or similar to a time domain signal are maintained by a combination of a DFT and an IFFT, in addition to a time domain signal to which a low PAPR modulation scheme has been applied.

Furthermore, the methods described with reference to FIGS. 14 and 15 may be applied to a case where a plurality of input bits is modulated based on a low PAPR modulation scheme (e.g., pi/2-BPSK or pi/4-QPSK) in NB-IoT.

FIG. 16 is a flowchart illustrating an example of an operation method of a UE that performs a method proposed in the present disclosure.

Referring to FIG. 16, the UE scrambles a plurality of bits for the transmission of an uplink signal (S16010).

Thereafter, the UE may generate a plurality of complex symbols by modulating the plurality of bits based on a specific modulation scheme (S16020).

In this case, the specific modulation scheme may use modulation schemes for a low PAPR. For example, the specific modulation scheme may be pi/2-BPSK or pi/4-QPSK.

Thereafter, the UE may perform a discrete Fourier transform (DFT) and an inverse fast Fourier transform (IFFT) by repeating the plurality of complex symbols in order to transmit an uplink signal to a BS using a physical uplink control channel (PUCCH) format 4 (S16030).

That is, if a plurality of UEs is multiplexed through an OCC, the UE may perform a discrete Fourier transform (DFT) and an inverse fast Fourier transform (IFFT) by repeating at least one complex symbol of the plurality of complex symbols by a given number of times.

Thereafter, the UE transmits, to the BS, an uplink signal (e.g., PUCCH, PUCCH) generated through the DFT and the IFFT (S16040).

In this case, a phase value of the at least one complex symbol may be increased or decreased by a specific value based on a symbol index.

That is, as described with reference to FIGS. 14 and 15, a phase value of each symbol may be increased or decrease by a specific value through a phase ramping or phase rotation method so that a phase difference between the repeated symbols does not occur by a maximum phase difference.

In this case, as described with reference to FIGS. 14 and 15, the specific value may be determined by at least one of the index of a symbol, a phase difference between symbols according to a modulation scheme, the length of a modulation symbol sequence, that is, the number of complex symbols (the number of modulation symbols) that are repeatedly transmitted, or the number of multiplexed UEs.

In relation to this, the aforementioned operation of the UE may be specifically implemented by a UE apparatus 1810, 1910 illustrated in FIGS. 18 and 19 of the present disclosure. For example, the aforementioned operation of the UE may be performed by a processor 1811, 1911 and/or an RF unit (or module) 1813, 1915.

Specifically, the processor 1811, 1911 may control to scramble a plurality of bits for the transmission of an uplink signal and to generate a plurality of complex symbols by modulating the plurality of bits based on a specific modulation scheme.

In this case, modulation schemes for a low PAPR may be used as the specific modulation scheme. For example, the specific modulation scheme may be pi/2-BPSK or pi/4-QPSK.

Furthermore, the processor 1811, 1911 may control to perform a discrete Fourier transform (DFT) and an inverse fast Fourier transform (IFFT) by repeating a plurality of complex symbols by a given number in order to control to transmit an uplink signal to a BS using the physical uplink control channel (PUCCH) format 4 through the RF unit (or module) 1813, 1915.

That is, if a plurality of UEs is multiplexed through an OCC, the processor 1811, 1911 may control to perform a discrete Fourier transform (DFT) and an inverse fast Fourier transform (IFFT) by repeating at least one complex symbol of the plurality of complex symbols by a given number of times.

Thereafter, the processor 1811, 1911 may control to transmit, to the BS, the uplink signal (e.g., PUCCH, PUCCH) generated through the DFT and IFFT, through the RF unit (or module) 1813, 1915.

In this case, a phase value of the at least one complex symbol may be increased or decreased by a specific value based on a symbol index.

That is, as described with reference to FIGS. 14 and 15, phase value of each symbol may be increased or decreased by a specific value through the phase ramping or phase rotation method so that a phase difference between the repeated symbols does not occur by a maximum phase difference.

In this case, as described with reference to FIGS. 14 and 15, the specific value may be determined by at least one of the index of a symbol, a phase difference between symbols based on a modulation scheme, the length of a modulation symbol sequence, that is, the number of repeatedly transmitted complex symbols (the number of modulation symbols), or the number of multiplexed UEs.

FIG. 17 is a flowchart illustrating an example of an operation method of a BS that performs a method proposed in the present disclosure.

Referring to FIG. 17, a BS may receive an uplink signal (e.g., PUSCH, PUCCH) from a UE (S17010).

In this case, the uplink signal may be transmitted through multiplexing between a plurality of UEs, and at least one modulation symbol may be repeatedly transmitted through the uplink signal.

In this case, if at least one modulation symbol is repeatedly transmitted, a phase value of each symbol may be increased or decreased by a specific value through a phase ramping or phase rotation method so that a phase difference between the repeated symbols does not occur by a maximum phase difference.

The specific value may be determined by at least one of the index of a symbol, a phase difference between symbols based on a modulation scheme, the length of a modulation symbol sequence, that is, the number of repeatedly transmitted complex symbols (the number of modulation symbols), or the number of multiplexed UEs, as described with reference to FIGS. 14 and 15.

In this case, at least one modulation symbol has been modulated through a specific modulation scheme. Modulation schemes for a low PAPR may be used as the specific modulation scheme. For example, the specific modulation scheme may be pi/2-BPSK or pi/4-QPSK.

In relation to this, the aforementioned operation of the BS may be specifically implemented by a BS apparatus 1820, 1920 illustrated in FIGS. 18 and 19 of the present disclosure. For example, the aforementioned operation of the BS may be performed by a processor 1821, 1921 and/or an RF unit (or module) 1823, 1925.

Specifically, the processor 1811, 1911 may control to receive an uplink signal (e.g., PUSCH, PUCCH) through the RF unit (or module) 1823, 1925.

In this case, the uplink signal may be transmitted through multiplexing between a plurality of UEs. At least one modulation symbol may be repeatedly transmitted through the uplink signal.

In this case, if at least one modulation symbol is repeatedly transmitted, a phase value of each symbol may be increased or decreased by a specific value through a phase ramping or phase rotation method so that a phase difference between the repeated symbols does not occur by a maximum phase difference.

The specific value may be determined by at least one of the index of a symbol, a phase difference between symbols based on a modulation scheme, the length of a modulation symbol sequence, that is, the number of repeatedly transmitted complex symbols (the number of modulation symbols), or the number of multiplexed UEs, as described with reference to FIGS. 14 and 15.

In this case, at least one modulation symbol has been modulated through a specific modulation scheme. Modulation schemes for a low PAPR may be used as the specific modulation scheme. For example, the specific modulation scheme may be pi/2-BPSK or pi/4-QPSK.

General Apparatus to Which the Present Disclosure May be Applied

FIG. 18 illustrates a block diagram of a wireless communication apparatus to which methods proposed in the present disclosure may be applied.

Referring to FIG. 18, a wireless communication system includes a BS 1810 and multiple UEs 1820 located within a BS area.

The BS and the UE may be represented as respective wireless apparatuses.

The BS 1810 includes a processor 1811, a memory 1812 and a radio frequency (RF) module 1813. The processor 1811 implements the functions, processes and/or methods proposed with reference to FIGS. 1 to 17. The layers of a radio interface protocol may be implemented by the processor. The memory is coupled to the processor and stores various pieces of information for driving the processor. The RF module is coupled to the processor and transmits and/or receives radio signals.

The UE includes a processor 1821, a memory 1822 and an RF module 1823.

The processor implements the functions, processes and/or methods proposed with reference to FIGS. 1 to 17. The layers of a radio interface protocol may be implemented by the processor. The memory is coupled to the processor and stores various pieces of information for driving the processor. The RF module 1823 is coupled to the processor and transmits and/or receives radio signals.

The memory 1812, 1822 may be inside or outside the processor 1811, 1821 and may be coupled to the processor by various well-known means.

Furthermore, the BS and/or the UE may have a single antenna or multiple antennas.

FIG. 19 is another example of a block diagram of the wireless communication apparatus to which methods proposed in the present disclosure may be applied.

Referring to FIG. 19, a wireless communication system includes a BS 1910 and multiple UEs 1920 disposed within the BS region. The BS may be represented as a transmission device, and the UE may be represented as a reception device, and vice versa. The BS and the UE include processors 1911 and 1921, memories 1914 and 1924, one or more Tx/Rx radio frequency (RF) modules 1915 and 1925, Tx processors 1912 and 1922, Rx processors 1913 and 1923, and antennas 1916 and 1926, respectively. The processor implements the above-described functions, processes and/or methods. More specifically, in DL (communication from the BS to the UE), a higher layer packet from a core network is provided to the processor 1911. The processor implements the function of the L2 layer. In DL, the processor provides the UE 1920 with multiplexing between a logical channel and a transport channel and radio resource allocation, and is responsible for signaling toward the UE. The TX processor 1912 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 1916 through an individual Tx/Rx module (or transmitter and receiver 1915). Each Tx/Rx module may modulate an RF carrier into each space stream for transmission. In the UE, each Tx/Rx module (or transmitter and receiver 1925)

receives a signal through each antenna 1926 of each Tx/Rx module. Each Tx/Rx module restores information modulated in an RF carrier and provides it to the RX processor 1923. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the BS. Such soft decisions may be based on channel estimation values. The soft decisions are decoded and deinterleaved in order to restore data and a control signal originally transmitted by the BS on a physical channel. A corresponding data and control signal are provided to the processor 1921.

UL (communication from the UE to the BS) is processed by the BS 1910 in a manner similar to that described in relation to the receiver function in the UE 1920. Each Tx/Rx module 1925 receives a signal through each antenna 1926. Each Tx/Rx module provides an RF carrier and information to the RX processor 1923. The processor 1921 may be related to the memory 1924 storing a program code and data. The memory may be referred to as a computer-readable medium.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present disclosure has been basically described based on an example in which the present disclosure is applied to the 3GPP LTE/LTE-A/NR systems, but may be applied to various wireless communication systems in addition to the 3GPP LTE/LTE-A/NR system.

The invention claimed is:

1. A method for transmitting, by a user equipment, an uplink signal in a wireless communication system, the method comprising:
   scrambling a plurality of bits for a transmission of the uplink signal;
   generating a plurality of complex symbols by modulating the plurality of bits based on a specific modulation scheme;
   performing an orthogonal cover code (OCC) multiplexing to at least one complex symbol of the plurality of complex symbols,
   wherein the OCC multiplexing is based on an OCC sequence set including at least one OCC sequence indexed by an OCC index;
   performing a discrete Fourier transform (DFT) and an inverse fast Fourier transform (IFFT) by repeating the at least one complex symbol of the plurality of complex symbols by a given number of times; and
   transmitting, to a base station, the uplink signal generated through the DFT and the IFFT,
   wherein based on (i) a specific number of user multiplexing and (ii) an OCC sequence with a specific value of the OCC index being configured, a phase value of each complex symbol included in the OCC multiplexed at least one complex symbol is increased or decreased by applying a specific phase value to the phase value of each the complex symbol based on a symbol index assigned to each the complex symbol included in the OCC multiplexed at least one complex symbol.

2. The method of claim 1,
   wherein the specific modulation scheme is $\pi/2$-binary phase shift keying (BPSK) or $\pi/4$-quadrature phase shift keying (QPSK) for a low peak to average ratio (PAPR).

3. The method of claim 1,
   wherein the OCC multiplexing is applied to the at least one complex symbol by repeating the at least one complex symbol and based on one of the at least one OCC sequence, and
   wherein each elements included in the one of the at least one OCC sequence is applied to each of the repeated at least one complex symbol.

4. The method of claim 3,
   wherein the specific value is determined based on a number of user equipments multiplexed through the OCC and the symbol index.

5. The method of claim 4,
   wherein the specific value is determined according to an equation below based on the number of multiplexed user equipments being equal to M $$x = \frac{\frac{\pi}{2}}{\frac{12}{M}}.$$

6. The method of claim 4,
wherein a number of the repeated at least one complex symbol is equal to the number of multiplexed user equipments.

7. The method of claim 3,
wherein a phase between adjacent two of the elements included in the one of the at least one OCC sequence has a phase difference of 0 or π.

8. The method of claim 1,
wherein the plurality of bits is transmitted using a physical uplink control channel (PUCCH) format 4.

9. The method of claim 1,
wherein a symbol number of the at least one complex symbol is an odd number.

10. The method of claim 1,
wherein the plurality of bits is randomized through the scrambling.

11. The method of claim 1,
wherein the uplink signal is a physical uplink shared channel (PUSCH) or a physical uplink control channel.

12. A user equipment for transmitting an uplink signal in a wireless communication system, the user equipment comprising:
a radio frequency (RF) module for transmitting and receiving radio signals; and
a processor functionally coupled to the RF module,
wherein the processor is configured to:
control to scramble a plurality of bits for a transmission of the uplink signal,
control to generate a plurality of complex symbols by modulating the plurality of bits based on a specific modulation scheme,
performing an orthogonal cover code (OCC) multiplexing to at least one complex symbol of the plurality of complex symbols,
wherein the OCC multiplexing is based on an OCC sequence set including at least one OCC sequence indexed by an OCC index;
control to perform a discrete Fourier transform (DFT) and an inverse fast Fourier transform (IFFT) by repeating the at least one complex symbol of the plurality of complex symbols by a given number of times, and
control to transmit, to a base station, the uplink signal generated through the DFT and the IFFT,
wherein based on (i) a specific number of user multiplexing and (ii) an OCC sequence with a specific value of the OCC index being configured, a phase value of each complex symbol included in the OCC multiplexed at least one complex symbol is increased or decreased by applying a specific phase value to the phase value of each the complex symbol based on a symbol index assigned to each the complex symbol included in the OCC multiplexed at least one complex symbol.

13. The user equipment of claim 12,
wherein the specific modulation scheme is π/2-binary phase shift keying (BPSK) or π/4-quadrature phase shift keying (QPSK) for a low peak to average ratio (PAPR).

14. The user equipment of claim 12,
wherein the OCC multiplexing is applied to the at least one complex symbol by repeating the at least one complex symbol and based on one of the at least one OCC sequence, and
wherein each elements included in the one of the at least one OCC sequence is applied to each of the repeated at least one complex symbol.

15. The user equipment of claim 14,
wherein the specific value is determined based on a number of user equipments multiplexed through the OCC and the symbol index.

16. The user equipment of claim 15,
wherein the specific value is determined according to an equation below based on the number of multiplexed user equipments being equal to M $$x = \frac{\frac{\pi}{2}}{\frac{12}{M}}.$$

17. The user equipment of claim 15,
wherein a number of the repeated at least one complex symbol is equal to the number of multiplexed user equipments.

18. The user equipment of claim 14,
wherein a phase between adjacent two of the elements included in the one of the at least one OCC sequence has a phase difference of 0 or π.

19. The user equipment of claim 12,
wherein the plurality of bits is transmitted using a physical uplink control channel (PUCCH) format 4.

20. The user equipment of claim 12,
wherein a symbol number of the at least one complex symbol is an odd number.

* * * * *